US011539458B2

(12) United States Patent
Noh et al.

(10) Patent No.: US 11,539,458 B2
(45) Date of Patent: Dec. 27, 2022

(54) MULTIPLE RESOURCE UNIT SIGNALING IN A WIRELESS LOCAL AREA NETWORK

(71) Applicant: NEWRACOM, Inc., Lake Forest, CA (US)

(72) Inventors: Yujin Noh, Lake Forest, CA (US); Sichan Noh, Irvine, CA (US); Jong-ee Oh, Lake Forest, CA (US); Dae Kyun Lee, Lake Forest, CA (US); Hyobin Yim, Lake Forest, CA (US); Youngjae Jung, Lake Forest, CA (US); Jaeyoung Ryu, Lake Forest, CA (US)

(73) Assignee: NEWRACOM, Inc., Lake Forest, CA (US)

(*) Notice: Subject to any disclaimer, the term of this patent is extended or adjusted under 35 U.S.C. 154(b) by 14 days.

(21) Appl. No.: 17/169,178

(22) Filed: Feb. 5, 2021

(65) Prior Publication Data
US 2021/0250119 A1 Aug. 12, 2021

Related U.S. Application Data

(60) Provisional application No. 63/012,702, filed on Apr. 20, 2020, provisional application No. 62/991,938,
(Continued)

(51) Int. Cl.
H04L 1/00 (2006.01)
H04W 72/04 (2009.01)
H04W 84/12 (2009.01)
(52) U.S. Cl.
CPC .......... H04L 1/0033 (2013.01); H04L 1/0061 (2013.01); H04W 72/04 (2013.01); H04W 84/12 (2013.01)

(58) Field of Classification Search
CPC ............. H04L 1/1812; H04L 27/26025; H04L 5/1469; H04L 5/0064; H04L 1/1887;
(Continued)

(56) References Cited

U.S. PATENT DOCUMENTS

| 11,252,717 B2* | 2/2022 | Islam ................ H04W 72/1242 |
| 2018/0070341 A1* | 3/2018 | Islam .................... H04L 1/1812 |
| 2021/0127291 A1* | 4/2021 | Chen .................... H04L 5/0048 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

Primary Examiner — Jung Liu
Assistant Examiner — Jung-Jen Liu
(74) Attorney, Agent, or Firm — Nicholson, De Vos, Webster & Elliott, LLP

(57) ABSTRACT

A method is described for transmitting a frame in a wireless network. The method includes setting, by a wireless device, a first field of the frame according to a first characteristic of the frame; setting, by the wireless device, a second field of the frame according to a second characteristic of the frame; setting, by the wireless device, a puncturing field of the frame in response to the first field of the frame meeting a first criteria and the second field of the frame meeting a second criteria, wherein the puncturing field is associated with puncturing a set of sub-channels of a transmission bandwidth of the frame; and transmitting, by the wireless device, the frame based on the transmission bandwidth and according to the set of sub-channels.

19 Claims, 57 Drawing Sheets

Related U.S. Application Data filed on Mar. 19, 2020, provisional application No. 62/983,514, filed on Feb. 28, 2020, provisional application No. 62/975,115, filed on Feb. 11, 2020, provisional application No. 62/971,875, filed on Feb. 7, 2020.

(58) Field of Classification Search
CPC . H04L 27/2602; H04L 5/0007; H04L 1/1822; H04L 5/0055; H04L 2001/0093; H04L 5/0048; H04L 5/0094; H04L 27/2603; H04L 5/0053; H04L 5/0035; H04L 5/001; H04L 5/0044; H04W 72/1242; H04W 72/044; H04W 72/042; H04W 88/08; H04W 88/02; H04W 28/06; H04W 28/0231; H04W 84/12; H04B 7/0452
See application file for complete search history.

(56) References Cited

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.

IEEE P802.11ax/D6.1, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, May 2020, 784 pages.

IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.

IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

* cited by examiner

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

FIG. 6

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG} * 4$ μs | 3.2 μs | 0.8 μs | 312.5 kHz |
| EHT-SIG FIELD 722 | EHT SIGNAL FIELD | $N_{EHESIG} * 4$ μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF} * $ (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA} * $ (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

RU Allocation subfield

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 0 (00000000) | 26 | 26 | 26 | 26 | 26 | 26 | 26 | 26 | 26 | 1 |
| 1 (00000001) | 26 | 26 | 26 | 26 | 26 | 26 | 26 | 52 | | 1 |
| 2 (00000010) | 26 | 26 | 26 | 26 | 26 | 52 | | 26 | 26 | 1 |
| 3 (00000011) | 26 | 26 | 26 | 26 | 26 | 52 | | 52 | | 1 |
| 4 (00000100) | 26 | 26 | 52 | | 26 | 26 | 26 | 26 | 26 | 1 |
| 5 (00000101) | 26 | 26 | 52 | | 26 | 26 | 26 | 52 | | 1 |
| 6 (00000110) | 26 | 26 | 52 | | 26 | 52 | | 26 | 26 | 1 |
| 7 (00000111) | 26 | 26 | 52 | | 26 | 52 | | 52 | | 1 |
| 8 (00001000) | 52 | | 26 | 26 | 26 | 26 | 26 | 26 | 26 | 1 |
| 9 (00001001) | 52 | | 26 | 26 | 26 | 26 | 26 | 52 | | 1 |
| 10 (00001010) | 52 | | 26 | 26 | 26 | 52 | | 26 | 26 | 1 |
| 11 (00001011) | 52 | | 26 | 26 | 26 | 52 | | 52 | | 1 |
| 12 (00001100) | 52 | | 52 | | 26 | 26 | 26 | 26 | 26 | 1 |
| 13 (00001101) | 52 | | 52 | | 26 | 26 | 26 | 52 | | 1 |

FIG. 19A

| | | | | | | | |
|---|---|---|---|---|---|---|---|
| 14 (00001110) | 52 | | 52 | 26 | 52 | 26 | 26 | 1 |
| 15 (00001111) | 52 | | 52 | 26 | 52 | | 52 | 1 |
| 16-23 (00010y₂y₁y₀) | 52 | | 52 | - | 106 | | | 8 |
| 24-31 (00011y₂y₁y₀) | 106 | | | - | 52 | | 52 | 8 |
| 32-39 (00100y₂y₁y₀) | 26 | 26 | 26 | 26 | 26 | 106 | | 8 |
| 40-47 (00101y₂y₁y₀) | 26 | 26 | 52 | 26 | 106 | | | 8 |
| 48-55 (00110y₂y₁y₀) | 52 | | 26 | 26 | 26 | 106 | | 8 |
| 56-63 (00111y₂y₁y₀) | 52 | | 52 | 26 | 106 | | | 8 |
| 64-71 (01000y₂y₁y₀) | 106 | | | 26 | 26 | 26 | 26 | 26 | 8 |
| 72-79 (01001y₂y₁y₀) | 106 | | | 26 | 26 | 26 | 52 | | 8 |
| 80-87 (01010y₂y₁y₀) | 106 | | | 26 | 52 | | 26 | 26 | 8 |
| 88-95 (01011y₂y₁y₀) | 106 | | | 26 | 52 | | 52 | | 8 |
| 96-111 (0110y₃y₂z₁z₀) | 106 | | | - | 106 | | | 16 |
| 112 (01110000) | 52 | | 52 | - | 52 | | 52 | 1 |
| 113 (01110001) | 242-tone RU empty (with zero users) | | | | | | | 1 |
| 114 (01110010) | 484-tone RU; contributes zero User fields to the User Specific field in the same HE-SIG-B content channel as this RU Allocation subfield | | | | | | | 1 |

FIG. 19B

| | | |
|---|---|---|
| 115 (01110011) | 996-tone RU; contributes zero User fields to the User Specific field in the same HE-SIG-B content channel as this RU Allocation subfield | 1 |
| 116-119 (011101$x_1x_0$) | Reserved | 4 |
| 120-127 (0111$y_2y_1y_0$) | Reserved | 8 |
| 128-191 (10$y_2y_1y_0z_2z_1z_0$) | 106 \| 26 \| 106 | 64 |
| 192-199 (1100$y_2y_1y_0$) | 242 | 8 |
| 200-207 (1101$y_2y_1y_0$) | 484 | 8 |
| 208-215 (1101$y_2y_1y_0$) | 996 | 8 |
| 216-223 (1101$y_2y_1y_0$) | Reserved | 8 |
| 224-255 (111$x_4x_3x_2x_1x_0$) | Reserved | 32 |

If signaling RUs of size greater than 242 subcarriers, $y_2y_1y_0$ = 000–111 indicates the number of User fields in the HE-SIG-B content channel that contains the corresponding 8-bit RU Allocation subfield. Otherwise, $y_2y_1y_0$ = 000–111 indicates the number of users multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $N_{user}(r, c) = 2^2 \times y_2 + 2^1 \times y_1 + y_0 + 1$ users multiplexed in the RU.

$z_2z_1z_0$ = 000–111 indicates the number of users multiplexed in the higher frequency 106-tone RU if there are two 106-tone RUs and one 26-tone RU is assigned between two 106-tone RUs. The binary vector $z_2z_1z_0$ indicates $N_{user}(r, c) = 2^2 \times z_2 + 2^1 \times z_1 + z_0 + 1$ users multiplexed in the RU.

Similarly, $y_1y_0$ = 00–11 indicates the number of users multiplexed in the lower frequency 106-tone RU. The binary vector $y_1y_0$ indicates $N_{user}(r, c) = 2^1 \times y_1 + y_0 + 1$ users multiplexed in the RU.

Similarly, $z_1z_0$ = 00–11 indicates the number of users multiplexed in the higher frequency 106-tone RU. The binary vector $z_1z_0$ indicates $N_{user}(r, c) = 2^1 \times z_1 + z_0 + 1$ users multiplexed in the RU.

1 to #9 (from left to the right) is ordered in increasing order of the absolute frequency.

$x_1x_0$ = 00–11, $x_4x_3x_2x_1x_0$ = 00000–11111.

'-' means no user in that RU, i.e., $N_{user}(r, c) = 0$.

For RU $r$ that is a 106-tone or larger RU, $N_{user}(r, c)$ is indicated by the letters (such as $y_2y_1y_0$ or $z_2z_1z_0$) in the RU allocation subfield above if the letters are present in the RU allocation subfield; otherwise $N_{user}(r, c) = 0$.

For RU $r$ that is a 26-tone or 52-tone RU, $N_{user}(r, c) = 1$.

FIG. 19C

| RU Allocation subfield | #1 | #2 | #3 | #4 | #5 | #6 | #7 | #8 | #9 |
|---|---|---|---|---|---|---|---|---|---|
| | 26 | 26 | 26 | 52 | 26 | 26 | | | |
| | 26 | 26 | 26 | | 26 | 26 | 26 | 26 | 26 |
| | 26 | 26 | 26 | 52 | 26 | | | 26 | 26 |
| | | | 106 | | 26 | 52 | | | |
| | | | 106 | | 26 | 52 | 106 | | |
| | | | | | | | 106 | | |

FIG. 20

| RU Allocation subfield | #1 | #2 | #3 | #4 | #5 | #6 | #7 | #8 | #9 |
|---|---|---|---|---|---|---|---|---|---|
| | 26 | 26 | 26 + 52 | | 26 | 26 + 52 | | 26 | 26 |
| | 26 | 26 | 26 | 26 | 26 | 26 | 26 | 26 | 26 |
| | 26 | | 26 + 52 | | 26 | | 52 + 26 | | |
| | 106 | | | | | 106 | | | |
| | | | 106 + 26 | | | 26 + 106 | | | |

FIG. 22

| RU ALLOCATION SUBFIELD | #1 | #2 | #3 | #4 | #5 | #6 | #7 | #8 | #9 | |
|---|---|---|---|---|---|---|---|---|---|---|
| | 26 | 26 | 52 | | 26 | 26 | 26 | 26 | 26 | CASE 1 |
| | 26 | 26 | 26 | 26 | 26 | 52 | 52 | 26 | 26 | CASE 1 |
| | 26 | 26 | | | 26 | | | | | |
| | | 106 | | | 26 | | 106 | | | CASE 2 |
| | | 106 | | | 26 | | 106 | | | CASE 2 |

FIG. 27

| | Compression Type | Puncturing | Common field |
|---|---|---|---|
| Case 1 | OFDMA | No compression (0) | O or X | RU allocation subfield Center RU26 beyond 40MHz |
| Case 2 | SU or full BW MU-MIMO | Compression 1 (1) | X | X |
| Case 3 | | Compression 2 (2) | O | Puncturing pattern subfield Center RU26 beyond 40MHz |

| B9 | B8B7...B1B0 | #1 | #2 | #3 | #4 | #5 | #6 | #7 | #8 | #9 | #10 | #11 | #12 | #13 | #14 | #15 | #16 | Number of Entries |
|---|---|---|---|---|---|---|---|---|---|---|---|---|---|---|---|---|---|---|
| 1 | "00000y3y2y1y0" | 242 | | | | | | | | | | | | | | | | up to 16 |
| 1 | "00001y3y2y1y0" | 484 | | | | | | | | | | | | | | | | up to 16 |
| 1 | "00010y3y2y1y0" | | 996 | | | | | | | | | | | | | | | | up to 16 |
| 1 | "00011y3y2y1y0" | | | | 2x996 | | | | | | | | | | | | | | up to 16 |
| ... | | | | | | | | | | | | | | | | | | | |
| 1 | "01100y3y2y1y0" | | 484 | 484 | | | | | | | | | | | | | | | up to 16 |
| 1 | "01101y3y2y1y0" | 484 | 996 | | | | 996 | 996 | | | | | | | | | | | up to 16 |
| 1 | "01110y3y2y1y0" | | 996 | | | 484 | | 996 | 484 | | | 996 | | | | | | | up to 16 |
| 1 | "01111y3y2y1y0" | | 996 | 484 | | | 996 | | | 484 | | 996 | | | | | | | up to 16 |
| 1 | "10000y3y2y1y0" | | 996 | | | | | 996 | | | 484 | 996 | | | | | | | up to 16 |
| 1 | "10001y3y2y1y0" | | 996 | | | | | 996 | | | | 996 | 484 | | | | | | up to 16 |

| B5-B2 | BW subfield | RU size | RU index |
|---|---|---|---|
| 0-3 | 80MH, 160MH, 240MHz, 320MHz | 242 | RU1, RU2, RU3 and RU4, respectively |
| 4-5 | 80MH, 160MH, 240MHz, 320MHz | 484 | RU1 and RU2, respectively |
| 6 | 80MH, 160MH, 240MHz, 320MHz | 996 | RU1 |
| 7-8 | 160MHz, 240MHz, 320MHz | 2x996 | RU1 and RU2, respectively |
| 9-10 | 240MHz, 320MHz | 3x996 | RU1 and RU2, respectively |
| 11 | 320MHz | 4x996 | RU1 |

| 80MHz  | RU1 | RU2 | RU3 | RU4 |
| 160MHz | RU1 | RU2 | RU3 | RU4 | RU5 | RU6 | RU7 | RU8 |
| 240MHz | RU1 | RU2 | RU3 | RU4 | RU5 | RU6 | RU7 | RU8 | RU9 | RU10 | RU11 | RU12 |
| 320MHz | RU1 | RU2 | RU3 | RU4 | RU5 | RU6 | RU7 | RU8 | RU9 | RU10 | RU11 | RU12 | RU13 | RU14 | RU15 | RU16 |

FIG. 47

| B5-B0 (or B6-B2) | BW subfield | RU size | RU index |
|---|---|---|---|
| 0 – 2 | 20MHz, 40MHz, 80 MHz, 160MHz | 26 | RU1, RU5, and RU8, respectively |
| 3 – 5 | 40MHz, 80 MHz, 160MHz | | R11, R14 and R17, respectively |
| 6 – 9 (6 – 10) | 80 MHz, 160MHz | | RU24, RU27, RU30, RU33, respectively (RU19 could be added) |
| 10 – 11 (11 – 12) | 20MHz, 40MHz, 80 MHz, 160MHz | 52 | RU2 and RU3, respectively |
| 12 – 13 (13 – 14) | 40MHz, 80 MHz, 160MHz | | RU6 and RU7, respectively |
| 14 – 15 (15 – 16) | 80 MHz, 160MHz | | RU11 and RU14, respectively |
| 16 – 17 (17 – 18) | 20MHz, 40MHz, 80 MHz, 160MHz | 106 | RU1 and RU2, respectively |
| 18 – 19 (19 – 20) | 40MHz, 80 MHz, 160MHz | | RU3 and RU4, respectively |
| 20 – 23 (21 – 24) | 80 MHz, 160MHz | | RU5 to RU8, respectively |

SETTING, BY A WIRELESS DEVICE, A FIRST FIELD OF A FRAME ACCORDING TO A FIRST CHARACTERISTIC OF THE FRAME
5502

SETTING, BY THE WIRELESS DEVICE, A SECOND FIELD OF THE FRAME ACCORDING TO A SECOND CHARACTERISTIC OF THE FRAME
5504

SETTING, BY THE WIRELESS DEVICE, A THIRD FIELD OF THE FRAME ACCORDING TO A THIRD CHARACTERISTIC OF THE FRAME
5506

SETTING, BY THE WIRELESS DEVICE, A PUNCTURING FIELD OF THE FRAME IN RESPONSE TO ONE OR MORE OF (1) THE FIRST FIELD OF THE FRAME MEETING A FIRST CRITERIA, (2) THE SECOND FIELD OF THE FRAME MEETING A SECOND CRITERIA, AND (3) THE THIRD FIELD OF THE FRAME MEETING A THIRD CRITERIA
5508

TRANSMITTING, BY THE WIRELESS DEVICE, THE FRAME BASED ON A TRANSMISSION BANDWIDTH AND ACCORDING TO A SET OF SUB-CHANNELS
5510

FIG. 55

MULTIPLE RESOURCE UNIT SIGNALING IN A WIRELESS LOCAL AREA NETWORK

CROSS-REFERENCE TO RELATED APPLICATION

This application claims the benefit of U.S. Provisional Patent Application No. 62/971,875, filed Feb. 7, 2020; U.S. Provisional Patent Application No. 62/975,115, filed Feb. 11, 2020; U.S. Provisional Patent Application No. 62/983,514, filed Feb. 28, 2020; U.S. Provisional Patent Application No. 62/991,938, filed Mar. 19, 2020; and U.S. Provisional Patent Application No. 63/012,702, filed Apr. 20, 2020, which are incorporated by reference herein in their entirety.

TECHNICAL FIELD

The present disclosure generally relates to wireless communications, and more specifically, relates to multiple resource unit signaling in a wireless local area network.

BACKGROUND ART

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table comparing various iterations of Institute of Electrical and Electronics Engineers (IEEE) 802.11 standard, in accordance with some embodiments of the present disclosure.

FIG. 7 shows a table, which describes fields of an Extreme High Throughput (EHT) frame format, in accordance with some embodiments of the present disclosure.

FIGS. 19A-19C show a resource allocation control field, in accordance with some embodiments of the present disclosure.

FIG. 20 shows a configuration for a resource allocation control field, in accordance with some embodiments of the present disclosure.

FIG. 22 shows a configuration for a resource allocation control field, in accordance with some embodiments of the present disclosure.

FIG. 27 shows a configuration for a resource allocation control field for combinations of resource units, in accordance with some embodiments of the present disclosure.

FIG. 30 shows three possible formats/cases for an EHT signal (SIG) field, in accordance with some embodiments of the present disclosure.

FIG. 33 shows an example resource unit allocation subfield, in accordance with some embodiments of the present disclosure.

FIG. 37 shows an assignment table for assignment of 80 MHz channels, in accordance with an example embodiment.

FIG. 41 shows a signaling configuration for puncturing, in accordance with an example embodiment.

FIG. 46 shows a configuration of resource units in various bandwidths, in accordance with an example embodiment.

FIG. 47 shows a configuration of resource units in various bandwidths, in accordance with an example embodiment.

FIG. 52 shows an assignment table, in accordance with an example embodiment.

FIG. 55 shows a method for transmitting a frame in a wireless network, in accordance with an example embodiment.

DETAILED DESCRIPTION

Figure 1:
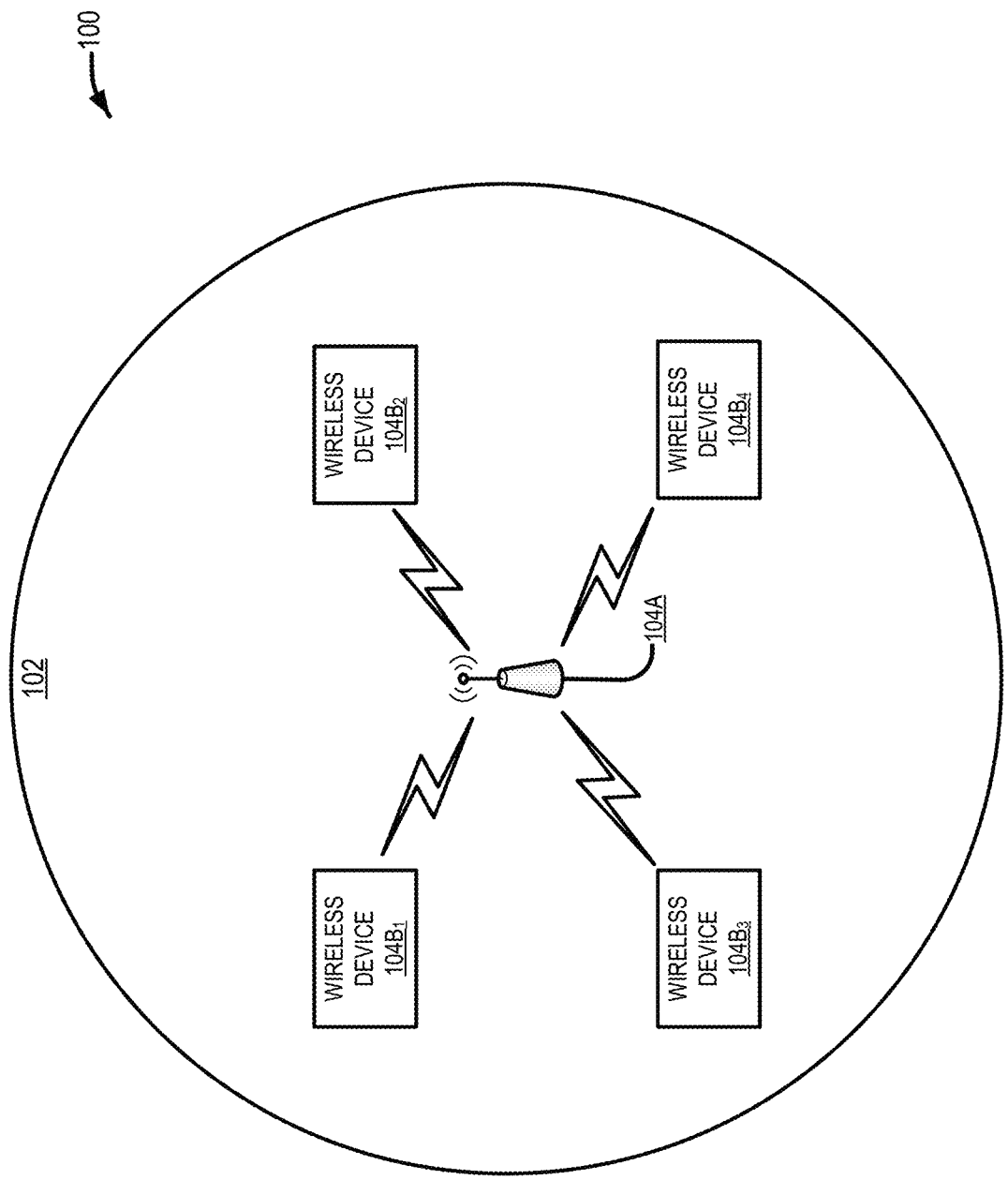
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to a resource unit allocation in a wireless local area network.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $104B_1$-$104B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $104B_1$-$104B_4$) may be collectively referred to as STAs. However, for ease of description, only the non-AP STAs may be referred to as STAs. Although shown with four non-AP STAs (e.g., the wireless devices $104B_1$-$104B_4$), the WLAN 100 may include any number of non-AP STAs (e.g., one or more wireless devices 104B).

Figure 2:
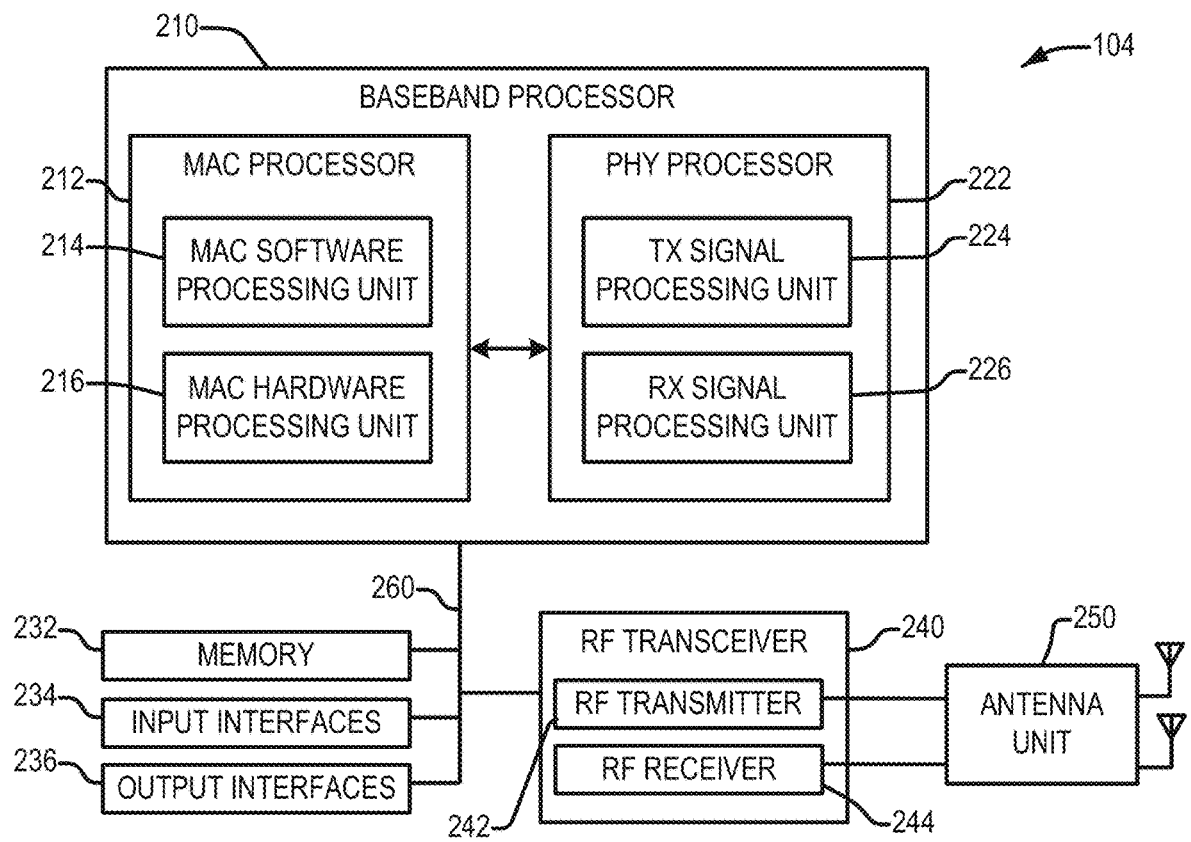
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $104B_1$-$104B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
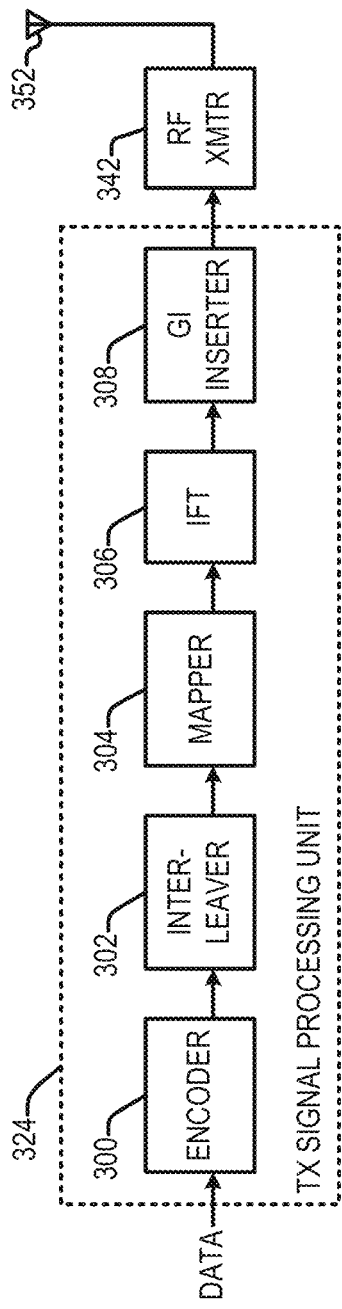
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
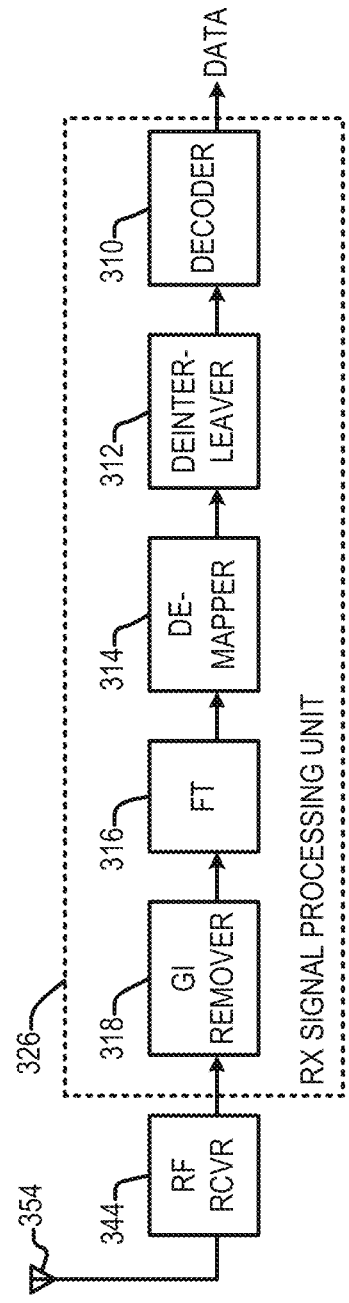
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
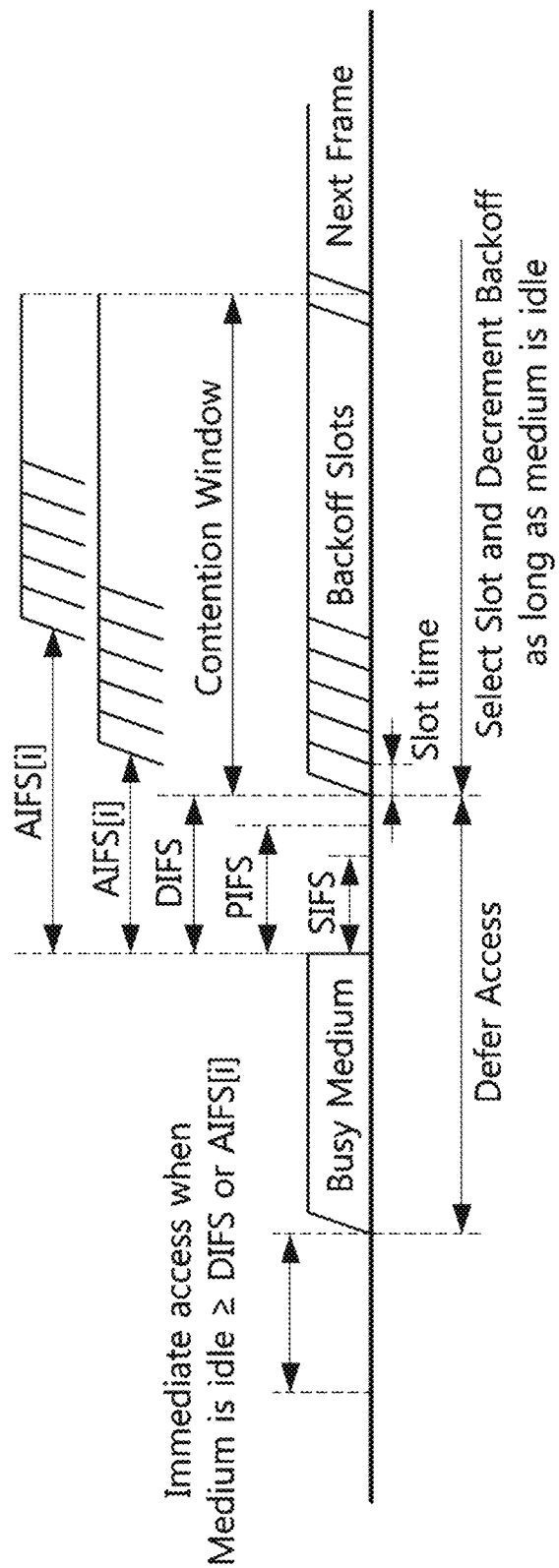
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
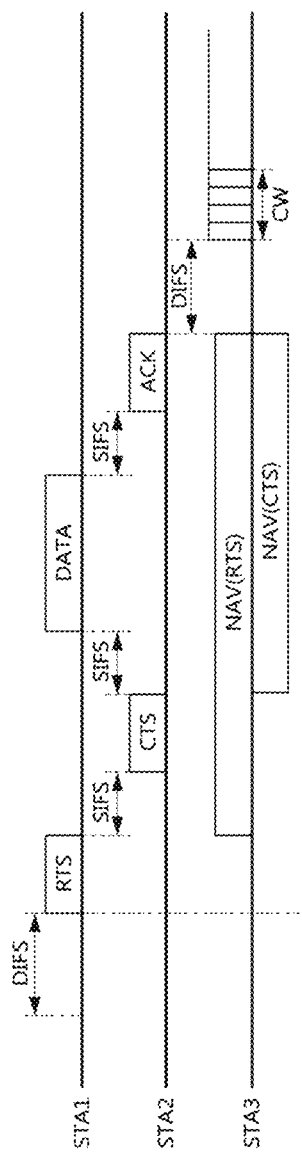
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+ SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (B×) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink(UL)/downlink(DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP coordination has been discussed as a possible technology to be adopted in IEEE 802.11be, where there is high level classification depending on various AP coordination schemes. For example, there is a first type of technique in which data for a user is sent from a single AP (sometimes referred to as "coordinated") or there is a second type of technique in which data for a user is sent from multiple APs (sometimes referred to as "joint").

For the coordinated AP technique, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. As for a joint AP technique, multiple APs are transmitting jointly to a given user.

Figure 8:
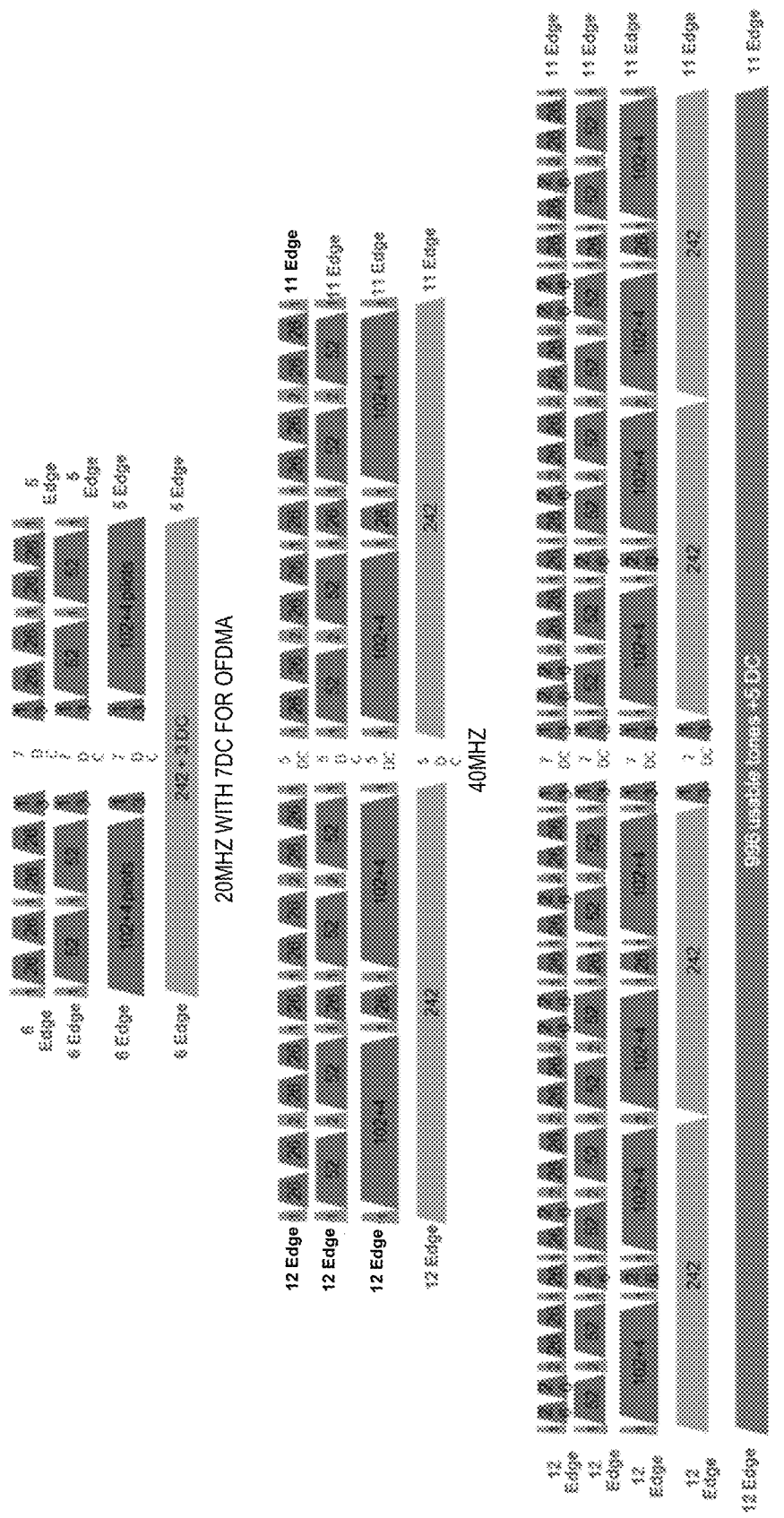
FIG. 8 shows an Orthogonal Frequency Division Multiple Access (OFDMA) numerology, in accordance with some embodiments of the present disclosure.
Figure 9:
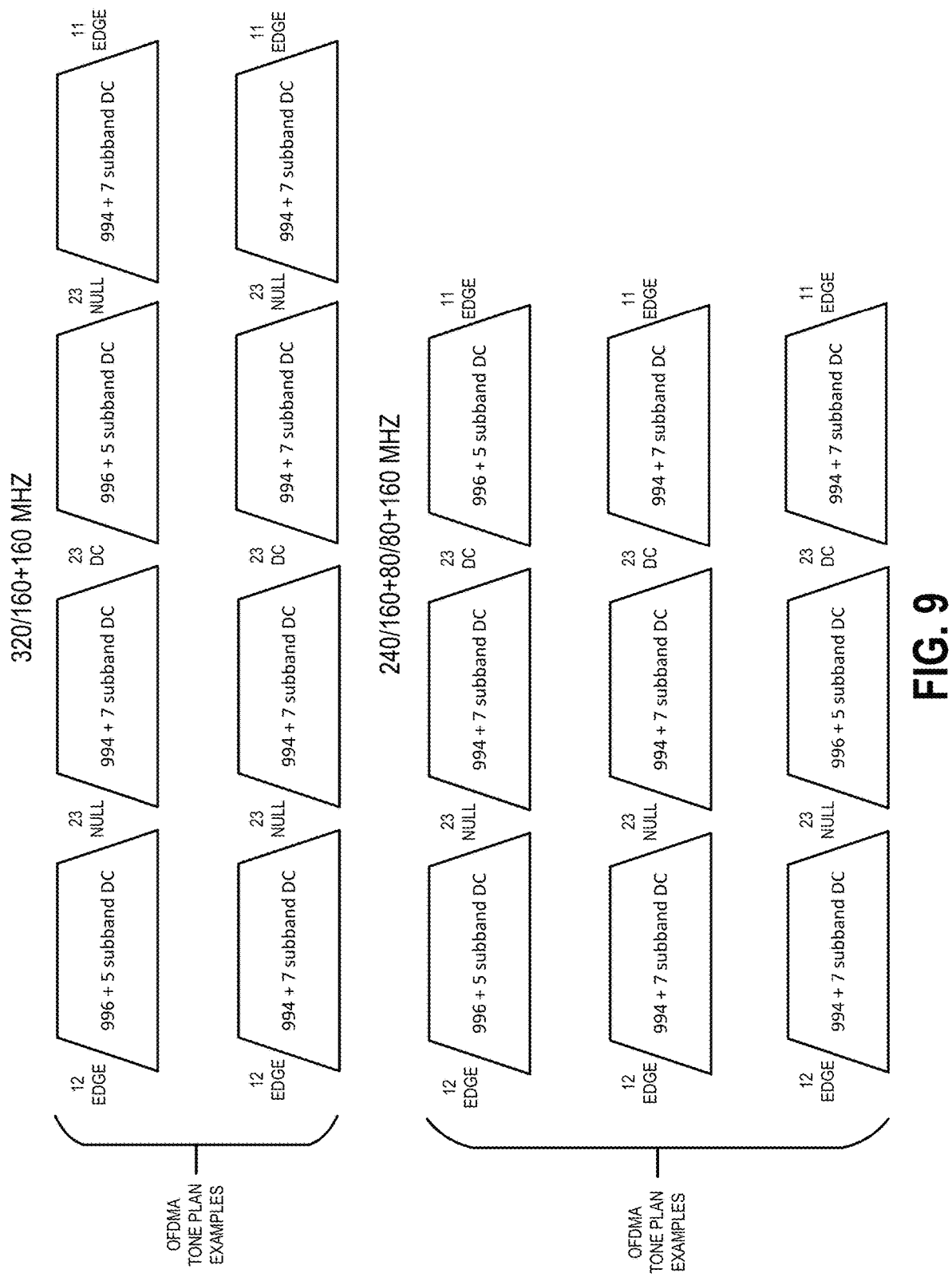
FIG. 9 shows an OFDMA numerology, in accordance with some embodiments of the present disclosure.

OFDMA numerology can be optimized depending on the design philosophy, considering tradeoffs between OFDMA gain and signaling overhead. Given an OFDMA numerology with limited flexibility, it might provide diversity gain without additional burdens/effects. For example, as shown in FIG. 8, some specific sizes and positions of resource units (RUs) are decided and corresponding BCC interleaver and LDPC tone mapper parameters are optimized for only given RUs. Those blocks could be extended for 160 MHz, 240 MHz, and 320 MHz bandwidths/transmissions as shown in the example of FIG. 9. RUs are building blocks for the scheduler to assign them 1) to different STAs and/or 2) some RUs to one STA in UL/DL OFDMA.

In particular, in FIG. 8, the 20 MHz OFDMA structure uses 26-tone RUs, 52-tone RUs, 106-tone RUs, and 242-tone RU at fixed positions. The 40 MHz OFDMA structure includes two replicas of the 20 MHz structure. The 80 MHz OFDMA structure is two replicas of the 40 MHz structure on top of one central 26-tone. In some embodiments, the 80 MHz OFDMA structure can remove the center 26-tone RU (i.e., the pair of 13-tones on either side of the 7 DC tones). The 160 MHz OFDMA structure is two replicas of the 80 MHz structure. In FIG. 9, the 320 MHz and 160+160 MHz modes/structures are new bandwidth modes/structures. These structures are not merely replicas of the 160 MHz structure used in IEEE 802.11ax. The 80 MHz single user (SU) numerology with 996 usable tones and the 80 MHz OFDMA numerology with 994 usable tones are selectively used to support flexible OFDMA in IEEE 802.11be. Moreover, the 240 MHz, 160+80 MHz, and 80+160 MHz modes/structures could be new bandwidths modes/structures in IEEE 802.11be. These structures also use the 80 MHz OFDMA numerology with 994 usable tones and the 80 MHz SU numerology with 996 usable tones to support flexibility in IEEE 802.11be. Utilizing variable bandwidth modes (e.g., 240 MHz, 320 MHz, etc.) in IEEE 802.11be has many benefits, including better throughput and efficiency. Further, in the 6 GHz frequency band, adopting various bandwidth modes may be more beneficial to channel availability avoiding incumbent devices in 6 GHz, to diminish interference.

Figure 10:
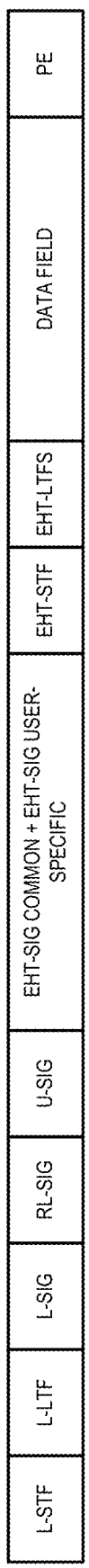
FIG. 10 shows an EHT single user (SU)/multi-user (MU) Physical Layer (PHY) Protocol Data Unit (PPDU) frame format, in accordance with some embodiments of the present disclosure.
Figure 11:
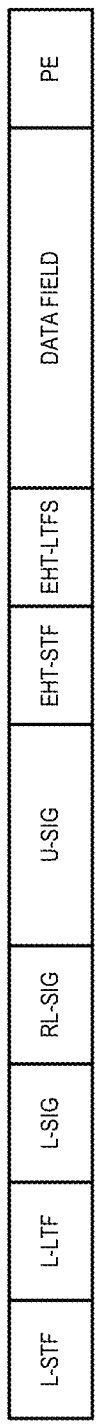
FIG. 11 shows an EHT trigger-based (TB) PPDU frame format, in accordance with some embodiments of the present disclosure.

In some embodiments, common and user specific fields, including sub-component like user fields, could be used to signal an EHT PPDU format within an EHT-SIG field. In some embodiments, at least two EHT PPDU formats can be used, including an EHT single user (SU)/multi-user (MU) PPDU and EHT trigger-based (TB) PPDU. FIG. 10 shows the format of an EHT SU/MU PPDU, according to one example embodiment. This EHT SU/MU PPDU format can be used for both SU and MU transmissions. FIG. 11 shows the format of an EHT TB PPDU, according to one example embodiment. This EHT TB PPDU format can be used for a transmission that is a response to a triggering frame from an AP.

The RL-SIG field, U-SIG field, EHT-STF, EHT-LTF and PE (Packet Extension) field can be present in all EHT PPDUs, including those shown in FIG. 10 and FIG. 11. In some embodiments, the EHT-SIG field is present only in EHT SU/MU PPDUs. The PE field allows more processing time on the receiver side. The L-STF, L-LTF, L-SIG, RL-SIG, U-SIG, and EHT-SIG fields can be referred to as pre-EHT modulated fields, while the EHT-STF, EHT-LTF and data fields are referred to as the EHT modulated fields.

The EHE-SIG field can provide OFDMA and DL MU-MIMO resource allocation information to allow STAs to look up the corresponding resources to be used in the EHT modulated fields of the PPDU (e.g., data fields). The EHT-SIG field of a 20 MHz (or 40 MHz if minimum resolution is 40 MHz) EHT PPDU contains one EHE-SIG content channel. The EHT-SIG field of an EHT PPDU that is 40 MHz (or 80 MHz if minimum resolution is 40 MHz) or wider could contain two EHT-SIG content channels. In one embodiment, an EHE-SIG content channel consists of a Common field, if present, followed by a User Specific field. With some specific cases (e.g., a full bandwidth MU-MIMO transmission), the Common field could not be present, and the EHT-SIG content channel(s) includes only the User Specific field. The Common field of an EHT-SIG content channel could contain information regarding the resource unit allocation such as the RU assignment to be used in the EHT modulated fields of the PPDU, the RUs allocated for MU-MIMO and the number of users in MU-MIMO allocations in OFDMA transmissions. The union of the User Specific fields in the EHT-SIG content channels contains information for all users in the PPDU on how to decode their payload.

Each User Specific field of an EHT-SIG content channel consists of or includes zero or more User Block fields followed by padding. Each User Block field is organized into User fields that contain information for STAs to decode their respective payloads. In a full BW MU-MIMO transmission case, as already mentioned above, there is no Common field in a content channel and the number of users is indicated by the other fields in the EHT-SIG field for decoding the STA's payloads.

The description herein considers resource allocation algorithms for RUs in different operating bandwidths, such as 20 MHz, 40 MHz . . . 320 MHz, especially for multiple RUs assigned to one STA. In some embodiments, RUs with equal to or more than 242 tones can be defined as large-size RUs while RUs with less than 242 tones can be defined as small-size RUs. To decrease too many RU combinations, some limitations could be applied. In some embodiments, combination of small-size RUs shall not cross 20 MHz channel boundaries. In some embodiments, small-size RUs can only be combined with small-size RUs and large-size RUs can only be combined with large-size RUs.

Figure 12:
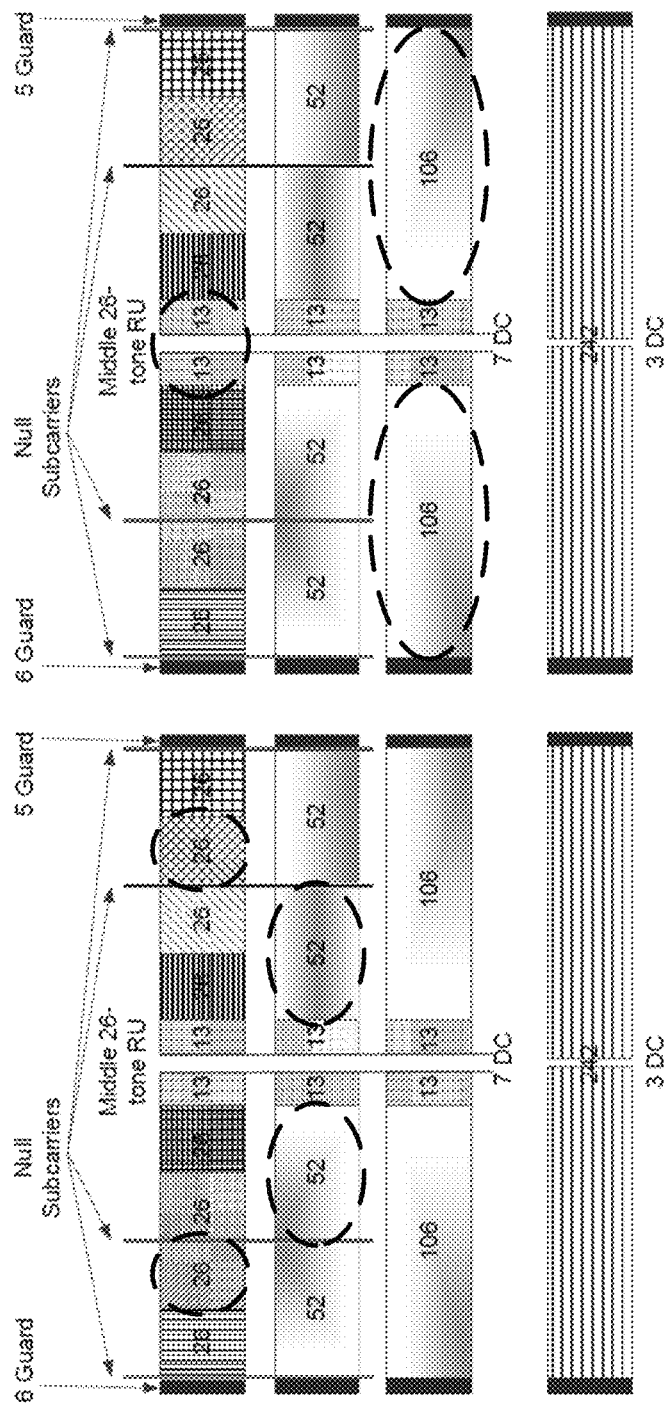
FIG. 12 shows combined resource units, in accordance with some embodiments of the present disclosure.
Figure 13:
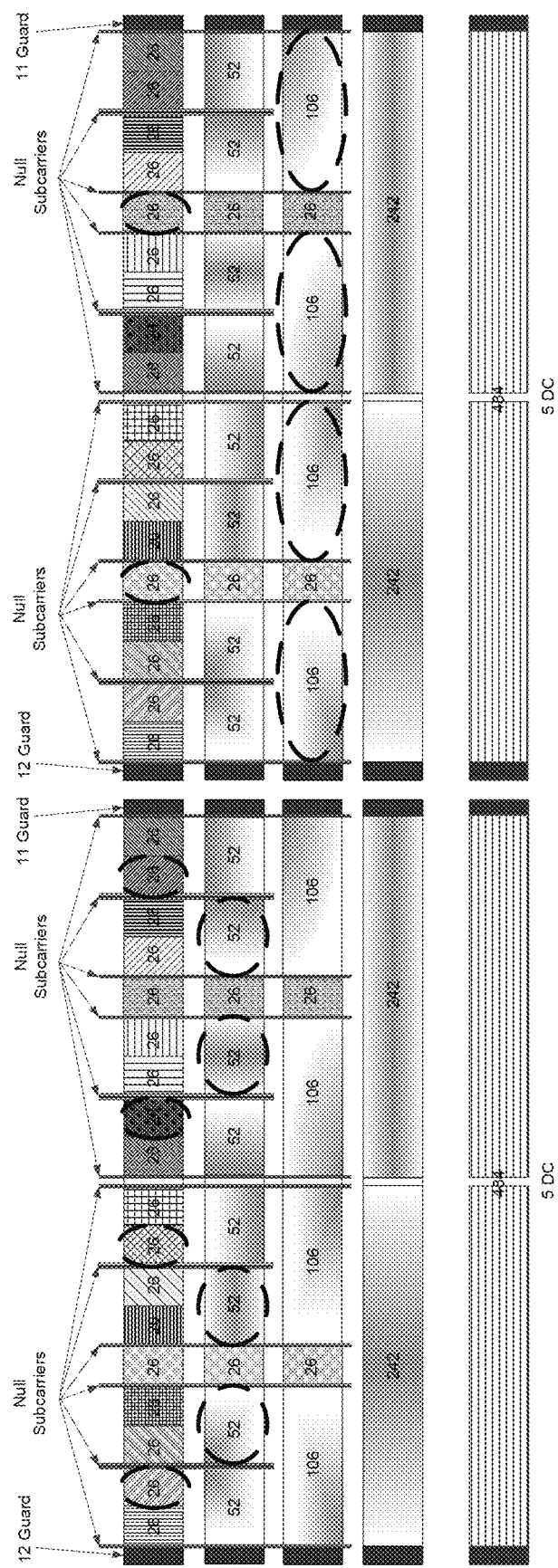
FIG. 13 shows combined resource units, in accordance with some embodiments of the present disclosure.

As noted above, in some embodiments, only small-size RU combinations are allowed. For instance, FIG. 12 and FIG. 13 show combinations of RU106+RU26 and RU52+RU26. For 20/40 MHz PPDUs, (1) boxed/circled contiguous combination of RU52 and RU26 are allowed and (2) any contiguous RU26 and RU106 within 20 MHz boundary can be combined.

Figure 14:
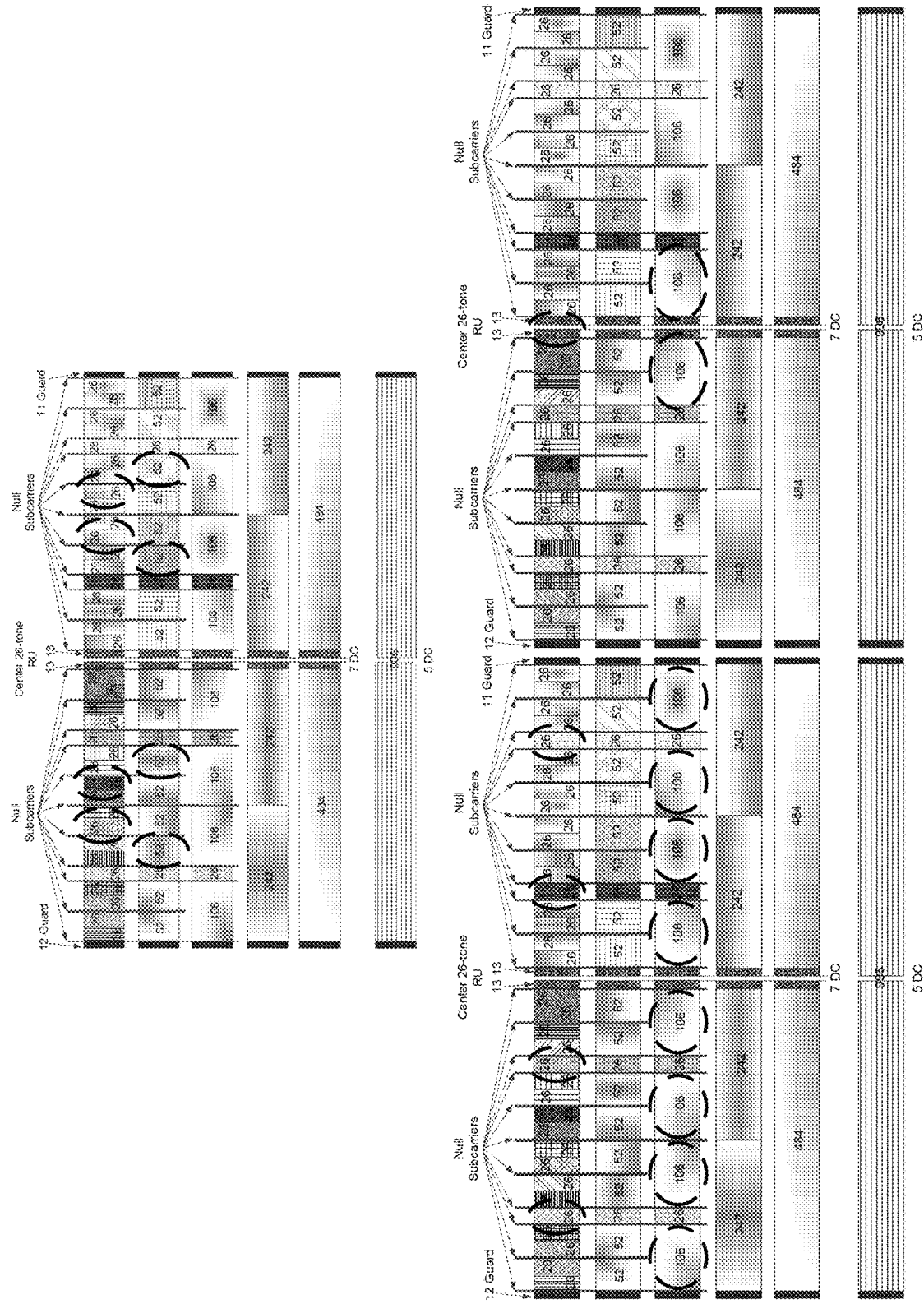
FIG. 14 shows combined resource units, in accordance with some embodiments of the present disclosure.

For 80 MHz PPDUs, (1) boxed/circled combinations of RU52 and RU26 are allowed, as shown in FIG. 14, (2) any contiguous RU26 and RU106 within 20 MHz boundary can be combined, and (3) RU106 plus center 26-tone RU cases can be combined.

Figure 15:
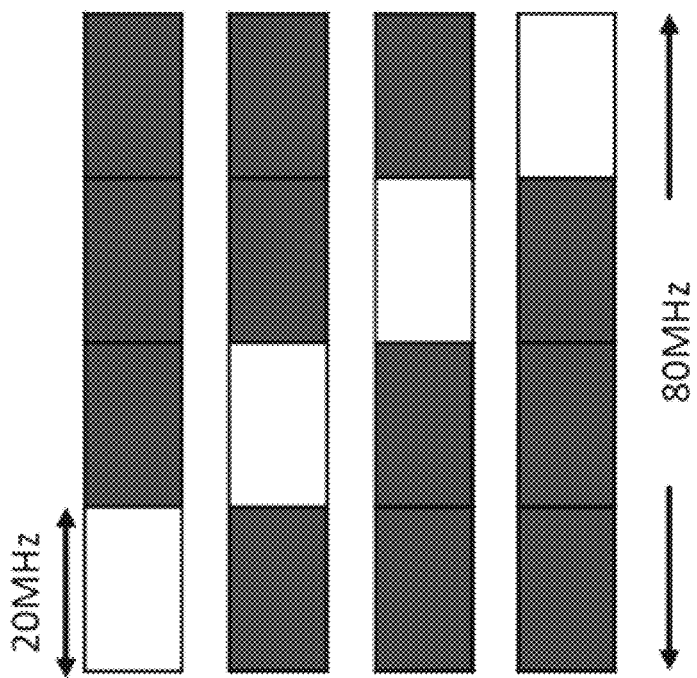
FIG. 15 shows resource unit combination for 60 MHz, in accordance with some embodiments of the present disclosure.
Figure 16:
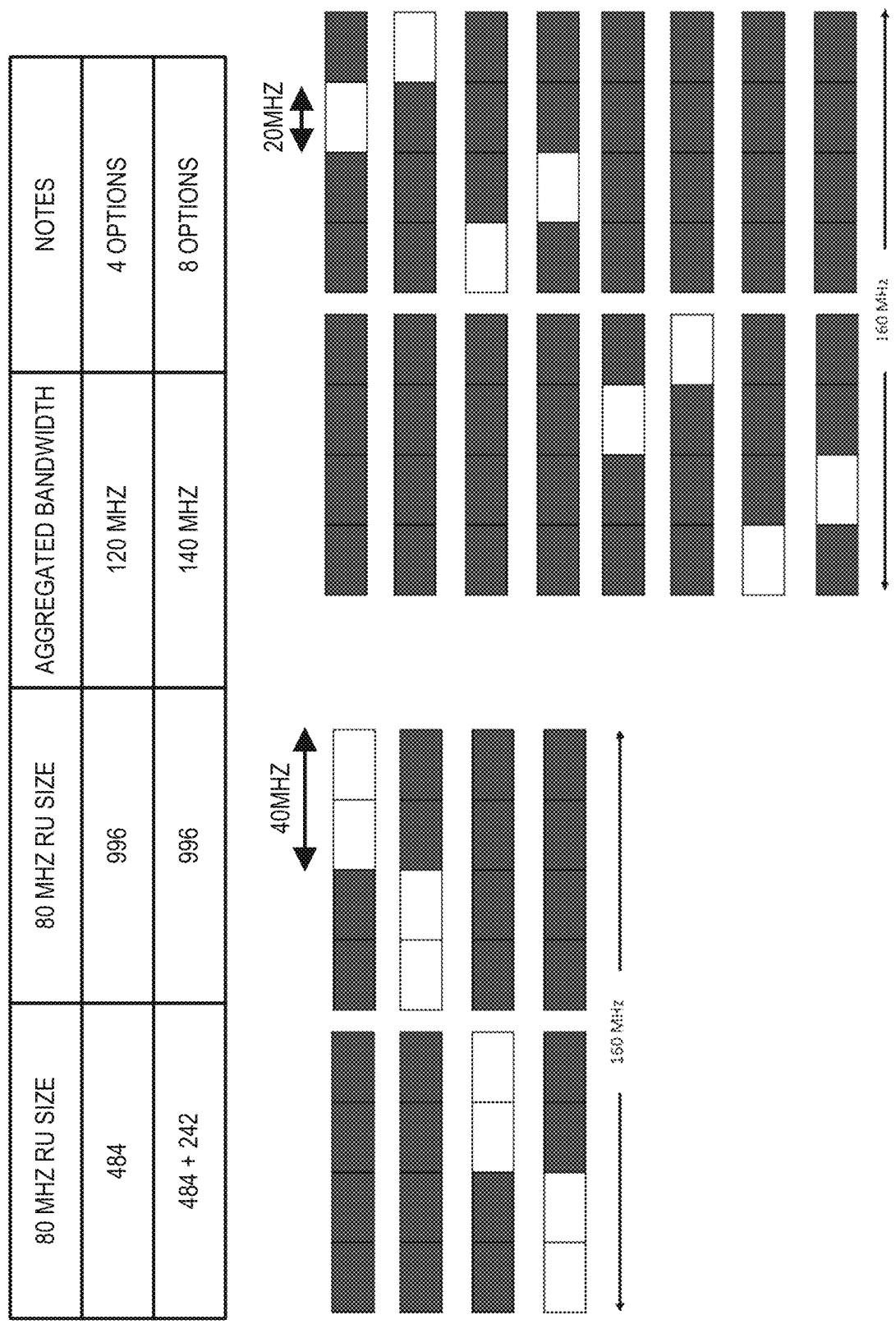
FIG. 16 shows resource unit combination for 120/140 MHz, in accordance with some embodiments of the present disclosure.
Figure 17:
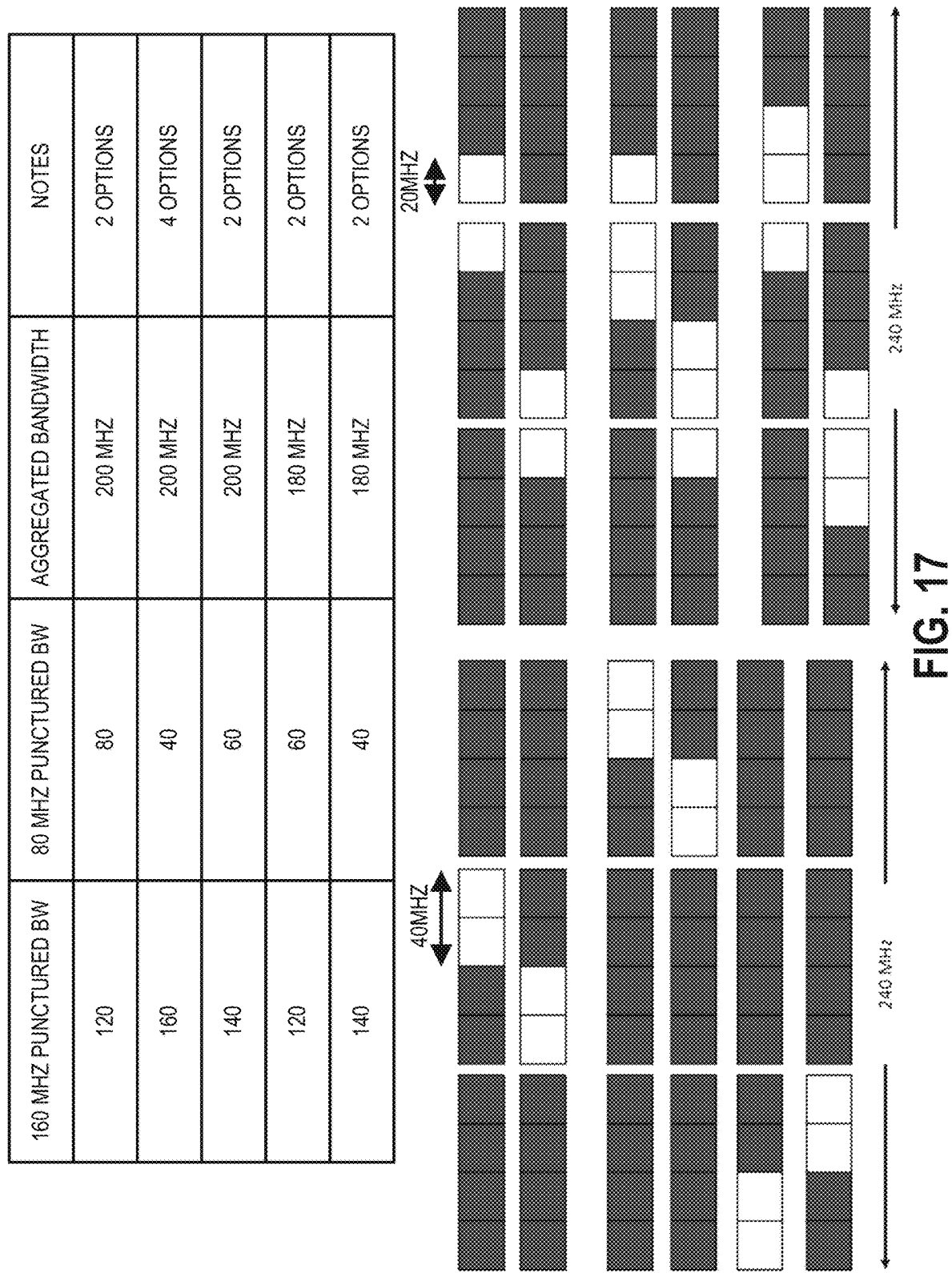
FIG. 17 shows resource unit combination for 200/180 MHz, in accordance with some embodiments of the present disclosure.
Figure 18:
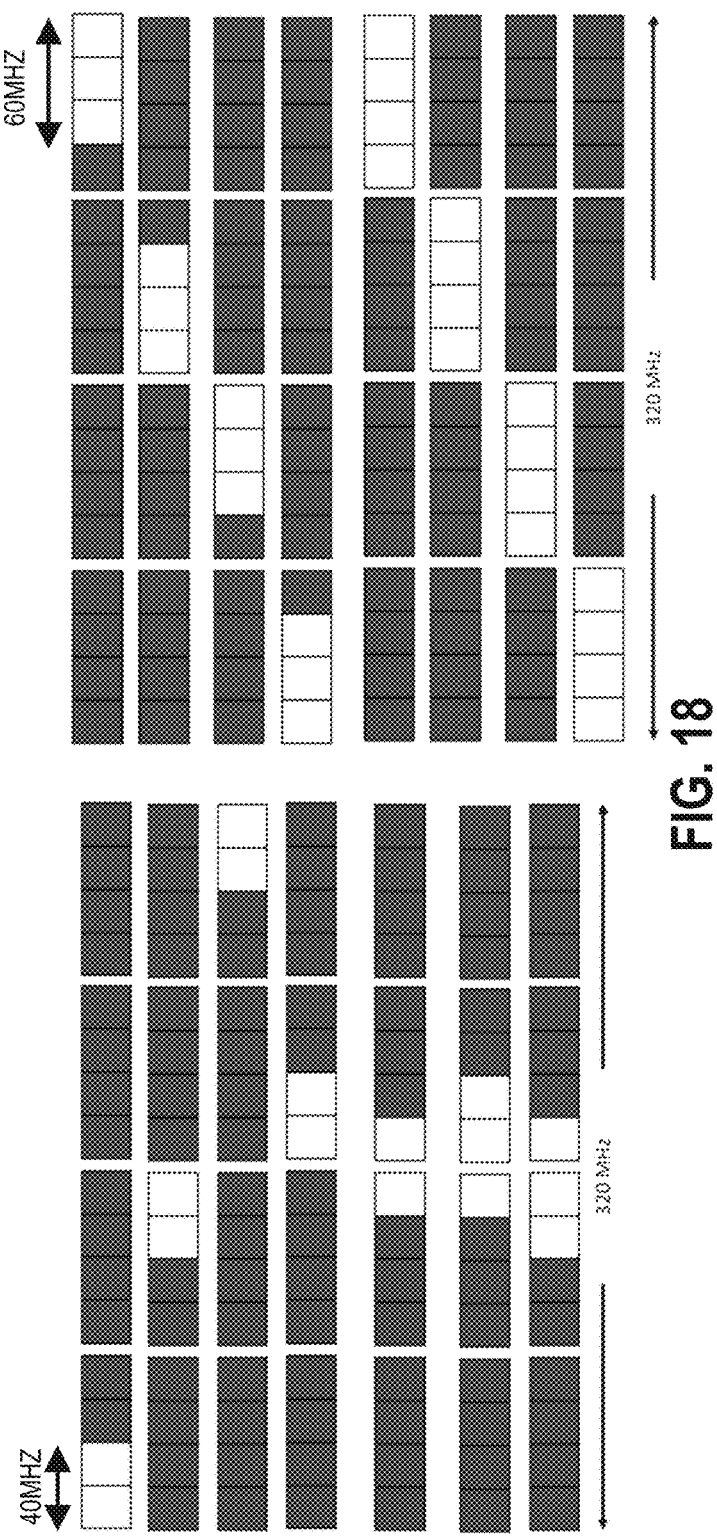
FIG. 18 shows resource unit combination for 280/260/240 MHz, in accordance with some embodiments of the present disclosure.

In some embodiments, in 80/160/240/320 MHz for SU and MU transmissions, RU aggregation could be implemented or named by preamble puncturing. For 80 MHz non-OFDMA (SU PPDU or full BW MU PPDU), FIG. 15 shows RU combination for 60 MHz. For 160 MHz non-OFDMA (SU PPDU or full BW MU PPDU), FIG. 16 shows RU combination for 120/140 MHz. For 240 MHz non-OFDMA (SU PPDU or full BW MU PPDU), FIG. 17 shows RU combination for 200/180 MHz. For 320 MHz non-OFDMA (SU PPDU or full BW MU PPDU), FIG. 18 shows RU combination for 280/260/240 MHz.

In some embodiments, different control fields can be used to indicate multiple RUs for one STA to use. In these embodiments, the indication can be according to RU group (e.g., small size RU, large size RU, etc.), where multiple small-size RUs could be indicated with a first control field and multiple large-size RUs could be indicated with a second control field. In some embodiments, the first control field could be the Reserved bits in an RU allocation subfield. In some embodiments, the first control field could be in a Common field in an EHT-SIG field. In some embodiments, the first control field could be indicated by the table shown in FIGS. 19A-19C, in which there are four states of 116-119 (011101x1x0), 8 states of 120-127 (01111y2y1y0), 8 states of 216-223 (11011y2y1y0), and 32 states of 224-255 (111x4x3x2x1x0).

Figure 21:
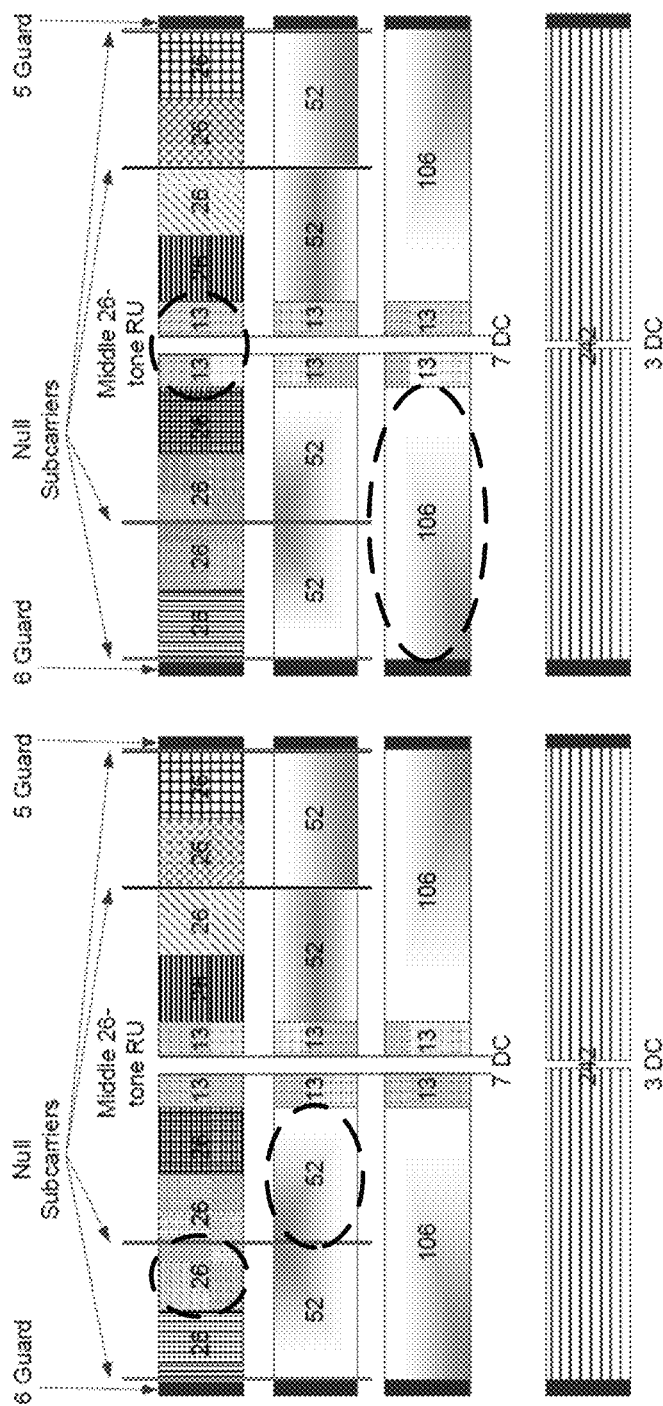
FIG. 21 shows combined resource units, in accordance with some embodiments of the present disclosure.

In one embodiment, the first control field represents the configuration shown in FIG. 20, with the dotted line between RU26 and RU52 (e.g., #2 and #3 of the first row)/RU106 and RU26 (e.g., #4 and #5 of the fourth row), indicates that RU26 and RU52 are assigned to one user/RU106 and RU26 are assigned to one user, respectively, as shown in FIG. 21.

Figure 23:
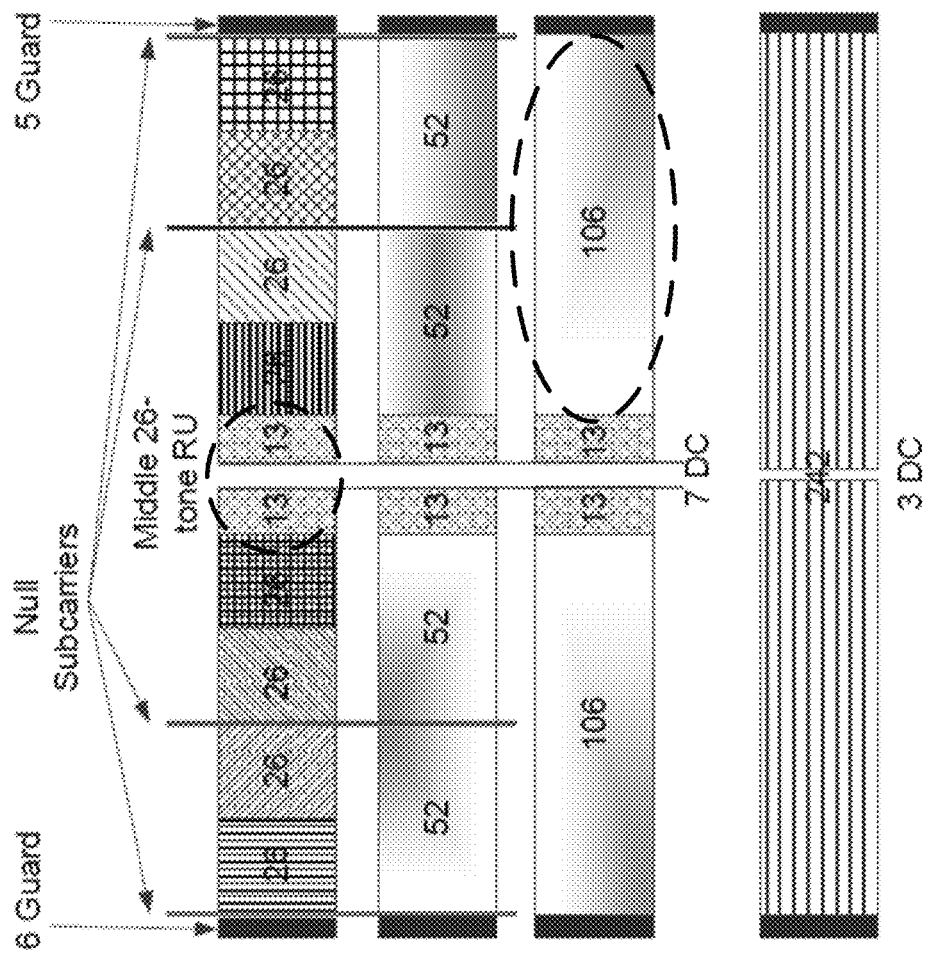
FIG. 23 shows combined resource units, in accordance with some embodiments of the present disclosure.

In one embodiment, the first control field represents the configuration shown in FIG. 22, with several RU26 and RU52 (RU26+RU52) and RU106 and RU26 (RU106+RU26) combined (an example of which is shown in FIG. 23) and assigned to one user, respectively.

Figure 24:
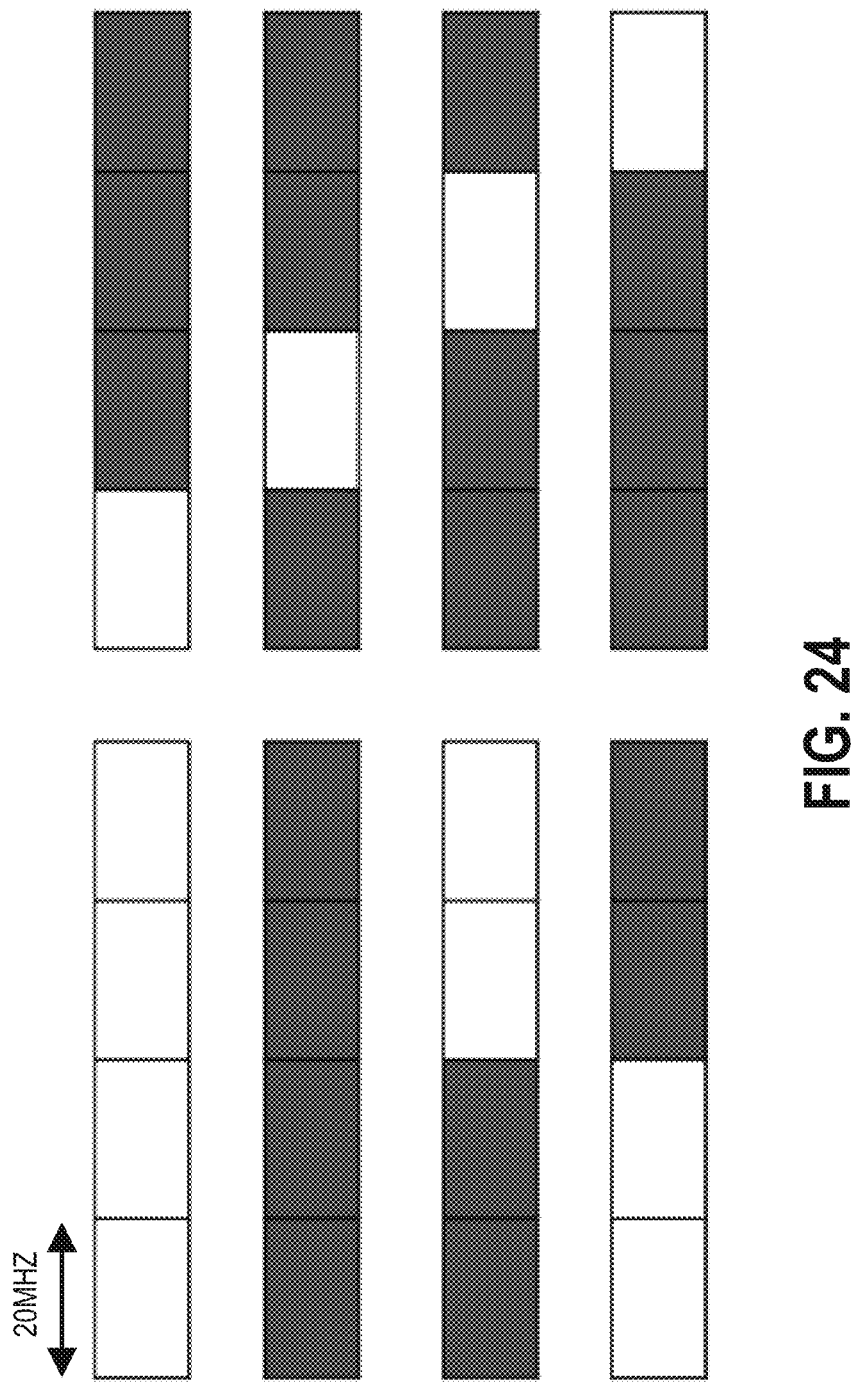
FIG. 24 shows puncturing patterns, in accordance with some embodiments of the present disclosure.

In one embodiment, the second control field could be a Puncturing pattern subfield or a Common field in an EHT-SIG field. In one embodiment, the second control field could include/consist of 3, 4, or 5 bits for an 80 MHz PPDU or could include/consist of 3N bits depending on channel content structure and bandwidth. In one embodiment, 3 bits could represent the puncturing patterns in which each 80 MHz has 3 bits with 8 states as shown in FIG. 24. In these embodiments, an assumption is that 80 MHz starts supporting puncturing and lower bandwidths do not support puncturing. In some embodiments, a primary 20 MHz channel is always present (not punctured) for an EHT PPDU. In some embodiments, four bits can be used as a bitmap to represent punctured 20 MHz channels/sub-channels in 80 MHz transmissions.

Figure 25:
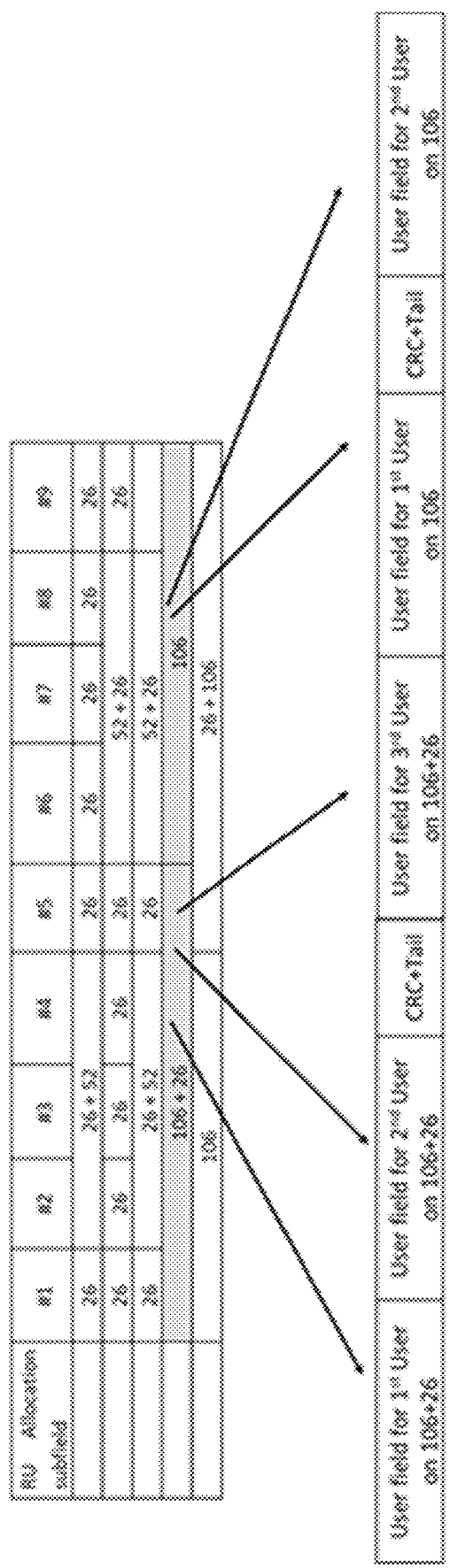
FIG. 25 shows a user field configuration example, in accordance with some embodiments of the present disclosure.

Additionally, to support aggregated RUs to transmit multiple RUs to a STA, in the case of either RU106+RU26 or RU26+RU106 assigned to a STA, MU-MIMO could be supported with up to N STAs, while in case of either RU52+RU26 or RU26+RU52 assigned to a STA, MU-MIMO is not supported. In these embodiments, N could be 4 or 8. For example, the number of states/options for RU106+RU26 or RU26+RU106 could be 16 or 64, respectively. To make implementation simpler, once a RU106+RU26 is assigned to a STA in MU-MIMO, the RU106+RU26 should be assigned to other STAs for MU-MIMO if needed, such that partial use of RU106 or RU26 in the RU106+RU26 cannot be assigned separately for other STAs in SU-MIMO. FIG. 25 shows an example in which 3 STAs are assigned an RU106+RU26 for MU-MIMO and 2 STAs are assigned for RU106 for MU-MIMO.

In one embodiment, a second control field is present/used in the PPDU based on third control information and/or fourth control information. In some embodiments, the second field could include puncturing pattern information as described herein. Namely, the second field could indicate a puncturing pattern for a set of sub-channels in a transmission bandwidth of a frame. For example, the second control field could be set to include a bitmap to indicate which sub-channels are punctured while in other embodiments a coding table can be used to indicate punctured sub-channels. In one embodiment, the second control field (sometimes referred to as a puncturing field or puncturing control field) could include or consist of 3 or more bits (e.g., 3, 4, or 5 bits). The third control information could be bandwidth related information for the PPDU (e.g., the third control information could be a set of bits that indicate whether a transmission bandwidth of the PPDU is 20 MHz, 40 MHz, 80 MHz, 160 MHz, etc.) and the fourth control information could be information related to puncturing. For example, the fourth control information can indicate when puncturing is available in the PPDU. For instance, puncturing may only be used in downlink (DL) PPDUs that is equal to or greater than a predefined bandwidth (e.g., 80 MHz). Accordingly, the fourth control information may be a downlink indication (e.g., when the fourth control information is set to a first value (e.g., 0 or 1), this indicates that the PPDU is for a downlink transmission, and when the fourth control information is set to a second value (e.g., 0 or 1), this indicates that the PPDU is for an uplink transmission). In some embodiments, the third control information could jointly indicate both BW and puncturing. For example, 20 MHz, 40 MHz, 80 MHz, 160 MHz, 240 MHz, 320 MHz, 80 MHz with puncturing, 160 MHz with puncturing, 240 MHz with puncturing, 320 MHz with puncturing, etc. could be indicated by coding of the third control information.

In some embodiments, given the size of the second control field can be less than the size of an RU allocation subfield (e.g., a first control field), the second control field could be indicated/used/present based on fifth control information that indicates compression type. The compression type can indicate whether and/or what compression is applied to the PPDU and particularly to a Common field of the PPDU. If a first compression type is indicated, this indicates that no compression is applied, and RU allocation subfield(s) are in the Common field in addition to a Center RU26 allocation field in case 80 MHz or larger than 80 MHz is being transmitted. If a second compression type is indicated, this indicates that no Common field is required because full BW is used for a SU transmission or a full BW MU-MIMO transmission. If a third compression type is indicated, this indicates the Common field includes the second field and a Center RU26 field.

In some embodiments, when the number of STAs needs to be indicated, one of the fields in U-SIG could be reinterpreted to the number of users to be assigned for a transmission (e.g., one user or more than one user could be indicated). When one STA/user is indicated, the second field indicates a punctured BW assigned to the STA. When more than one STA is indicated, the second field indicates a punctured BW assigned to the STAs. In some embodiments, the reinterpreted field could be the number of EHT-SIG symbols that indicate the number of EHT-SIG OFDM symbols in the PPDU.

Figure 26:
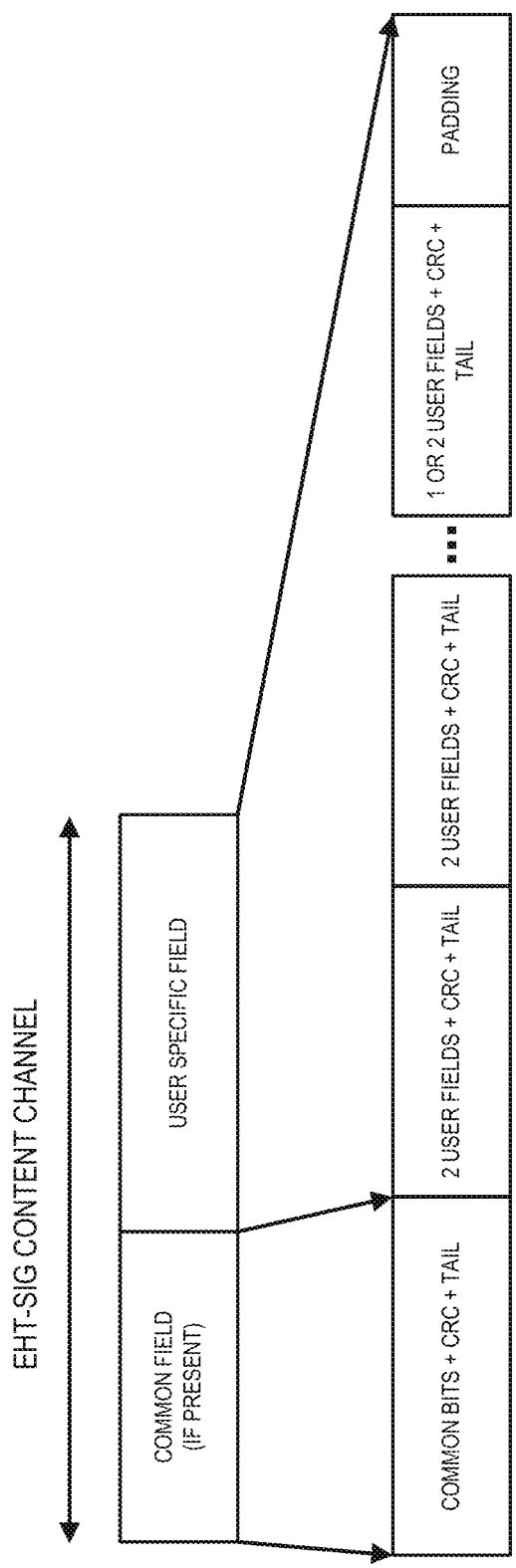
FIG. 26 shows a user block field example, in accordance with some embodiments of the present disclosure.

FIG. 26 shows that each User Block field, except the final User Block field, is organized of User fields that contain information for STAs (e.g., up to two Users fields for two STAs) to decode each STA's payloads. The final User Block field includes information depending on the number of users in the EHT-SIG content channel (e.g., one or two STAs).

However, assuming multiple RUs assigned to one STA, if assigned RUs are separately encoded in different User Block fields and some errors occur in one or more of the User Block fields that contain RUs assigned to different STAs, it will increase error rates for many STAs. In one embodiment, one User Block field (or A field) includes or consists of User field(s) (or B field) to be assigned to one STA and the User Block fields each contain a CRC field and a tail field. In some embodiments, each User Block field could contain up to N User fields jointly encoded (e.g., N=2). For example, when two RUs are assigned to one STA, then two User fields that are related to those RUs are jointly encoded in a single User Block field. To increase efficiency, assuming up to N RUs could be jointly encoded in one User Block field, when N RUs are assigned to M STAs, N RUs could be jointly encoded with one User Block field. For example, for case 1 in the table of FIG. 27, which shows case 1 and case 2, one User field is assigned to one STA for the first User Block field, two User fields are assigned to one STA for the second User Block field, two User fields are assigned to two STAs for the third User Block field, two User fields are assigned to two STAs for the fourth User Block field, and one User field is assigned to one STA for the fifth User Block field.

In one embodiment, one or more than one User Block field(s) (or A field) includes or consists of User field(s) (or B field) to be assigned to one STA, wherein each User Block field contains N User field(s), a CRC field, and a tail field. In case assigned RUs are larger than N, more than one User Block fields are assigned to the STA. Comparing to some embodiments described above, this embodiment can reduce the total number of CRC fields and tail fields because one User Block field could contain User fields to be assigned to different STAs.

Figure 28:
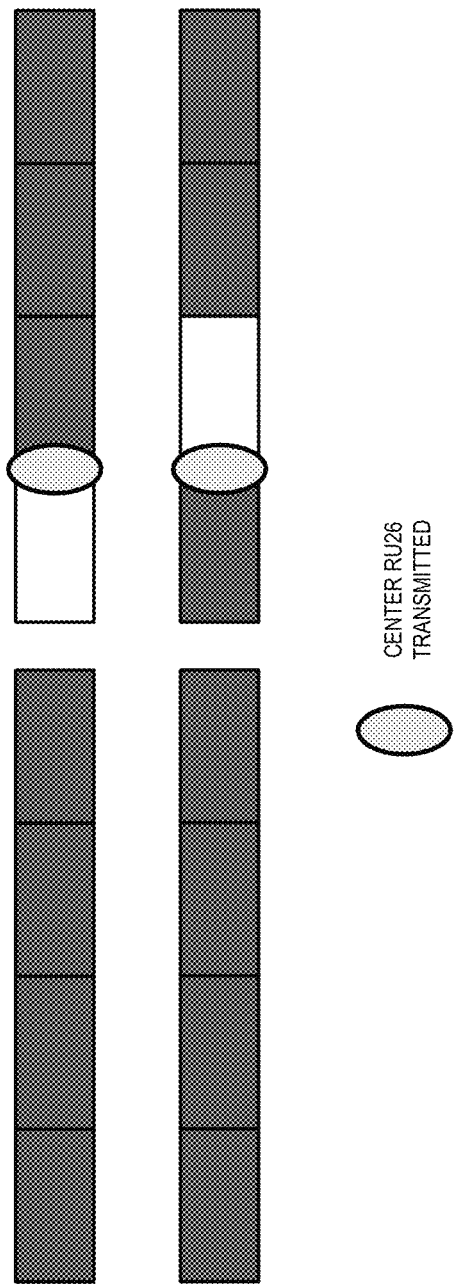
FIG. 28 shows transmission of a punctured PPDU with center resource unit, in accordance with some embodiments of the present disclosure.

In one embodiment, assuming there is/are a Center RU26(s) in a 160/240/320 MHz transmission, when a puncturing feature is applied to SU and full BW MU-MIMO, the Center RU26(s) are transmitted together when the at least one non-punctured portion just next to the Center RU26(s) is transmitted. In this case, an indication corresponding to the Center RU26 is set to a first state and the first state indicates that the corresponding Center RU26 is transmitted. In one embodiment, the indication could be in a Common field of the EHT-SIG field. For example, when a 160 MHz PPDU with 140 MHz aggregated BW is transmitted, as shown in FIG. 28, the Center RU26 is transmitted as well. The Center RU26 in 80 MHz with no puncturing is omitted.

Figure 29:
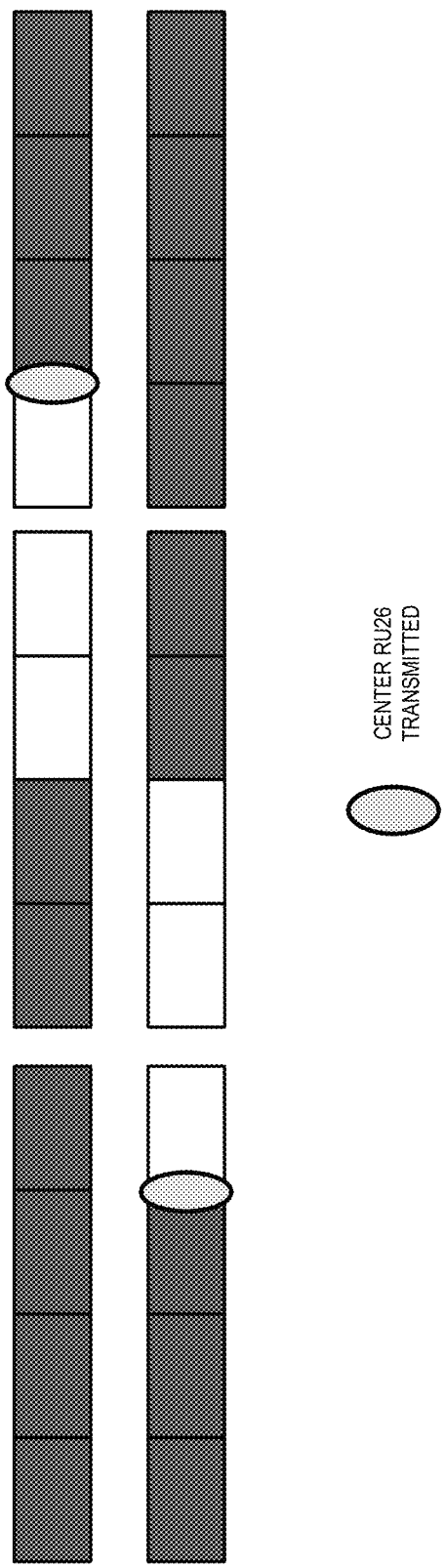
FIG. 29 shows transmission of a punctured PPDU with center resource unit, in accordance with some embodiments of the present disclosure.

In another example, when a 240 MHz PPDU with 180 MHz aggregated BW is transmitted, as shown in FIG. 29, the Center RU26 is transmitted as well. The Center RU26 in 80 MHz with no puncturing is omitted.

In some embodiments, the EHT-SIG field could have different formats depending on compression type and a puncturing feature. For example, FIG. 30 shows three possible formats/cases for the EHT-SIG field. As shown in FIG. 30, case 1 is the EHT-SIG field format consisting of or including a Common field and a User-specific field for OFDMA transmission. A puncturing feature could be applied to this transmission format. Case 2 is the EHT-SIG field format consisting of or including only a User-specific field without a Common field for SU or full BW MU-MIMO transmission without a puncturing feature. Case 3 is the EHT-SIG field format consisting of or including a Common field and a User-specific field for SU or full BW MU-MIMO transmission with a puncturing feature. SU or full BW MU-MIMO could be called non-OFDMA transmission.

In one embodiment, in case of the assigned number of STAs needs to be indicated for SU or full BW MU-MIMO transmission (non-OFDMA transmission), one of the fields (e.g., a first field) in U-SIG could be reinterpreted as the number of users to be assigned for a transmission. In this embodiment, the reinterpreted field could indicate one or more than one user for the User-specific field. The first field could be differently reinterpreted based on the setting of a second field. In one embodiment, the second field could be a non-OFDMA (or OFDMA) field that indicates whether the PPDU is a OFDMA transmission or a non-OFDMA transmission. When non-OFMDA is indicated, the first field could be reinterpreted as the number of users. When OFDMA is indicated by the second field, the first field could be interpreted as the number of EHT-SIG OFDM symbols. When non-OFDMA is indicated, the first field could be reinterpreted to two fields consisting of or including of a compression type field (e.g., 1 bit) and a number of users field. Considering the limited number of users assigned for MU-MIMO, the first field may have space to support two different fields.

In one embodiment, given SU and MU is supported with one PPDU format, when the assigned number of STAs needs to be indicated for SU or full BW MU-MIMO transmission (non-OFDMA transmission), the number of EHT-SIG OFDM field or the number of user field could be used. For example, a first state (e.g., 0) indicates only SU transmission and a second state (e.g., 1, 2, etc.) indicates MU-MIMO transmission. When the number of EHT-SIG OFDM symbols is used to indicate whether SU transmission is used or not, a specific number of EHT-SIG OFDM symbols with specific MCS could be jointly used. For example, one EHT-SIG OFDM symbol with MCS0 indicates SU transmission.

In some embodiments, an RU position field could be introduced to the PPDU. This RU position field could help inform the location of its RU allocation subfield over the entire bandwidth. For example, with a 16-bit RU position field, each bit corresponds to the location of each 242 RU such that the bit corresponding to the location is set to 1. For example, 0010,0000,0000,0000 means the third 242 RU is at least the RU assigned to a STA regardless of its aggregated RU size. It would be 242 RU or aggregated RU (including the third 242 RU). The size of the RU position field could be variable depending on the channel bandwidth and its unit (e.g., 242 RU, 484 RU, etc.).

Figure 31:
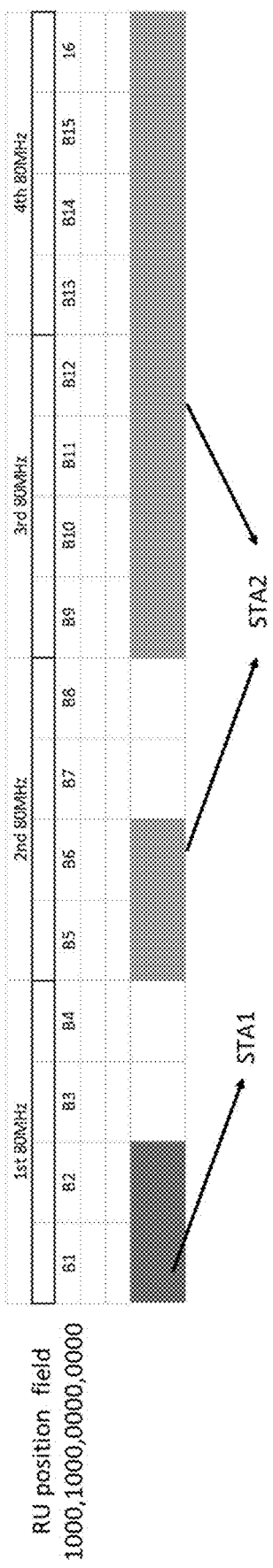
FIG. 31 shows an example resource unit position field, in accordance with some embodiments of the present disclosure.

In some embodiments, a total number of bits setting to 1 in the RU position field could be used to indicate a number of STAs assigned over an entire bandwidth. In case of only one RU allocation subfield assigned to one STA, the total number of bits is the number of assigned STAs over the entire bandwidth. In case of one RU allocation assigned to multiple users for MU-MIMO, then 1 bit of each location is multiplied by the number users for MU-MIMO and the summation is taken over the entire bandwidth. For instance, with 1000,1000,0000,0000 in an RU position field, as shown in FIG. 31, this example shows there are two STAs with 484RU and an aggregated RU (484RU+996RU+996RU). The total number of ones is 2, which indicates the total number of assigned STAs over entire bandwidth.

Figure 32:
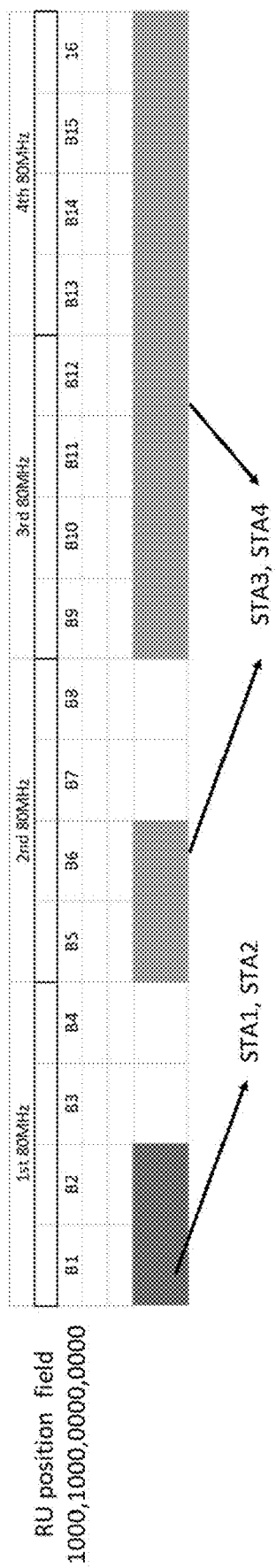
FIG. 32 shows an example resource unit position field, in accordance with some embodiments of the present disclosure.

With 1000,1000,0000,0000 in an RU position field, as shown in FIG. 32, this example shows there are four STAs with 484RU and an aggregated RU (484RU+996RU+996RU). To determine the total number of STAs over the entire bandwidth, each bit set to 1 is multiplied with the number of assigned STAs to each RU as indicated in the RU allocation subfield (an example of which is shown in FIG.

33). The value of one RU allocation subfield indicates that two STAs are assigned with 1011010001 for STA3 and STA4. The value of one RU allocation subfield indicates that two STAs are assigned with 100000001 for STA1 and STA2. For MU-MIMO, the RU position field and RU allocation field could be used to know the number of STAs assigned over the entire bandwidth. In one embodiment, the RU position field and RU allocation field are located before a User-specific field.

In one embodiment, given SU and MU is supported with one PPDU format, there is non-overlapping control information, which can be called first information only for SU transmission and second information only for MU transmission. When the number of users is more than one, which means MU transmission, the non-overlapping control information is interpreted with the second information. When the number of users is exactly one, which means SU transmission, the non-overlapping control information is interpreted with the first information.

For example, a beam-change feature is supported only for SU transmission, wherein the beam-change field is located as a non-overlapping field. When the number of users is more than one, the bean change field should be set to 0.

Figure 34:
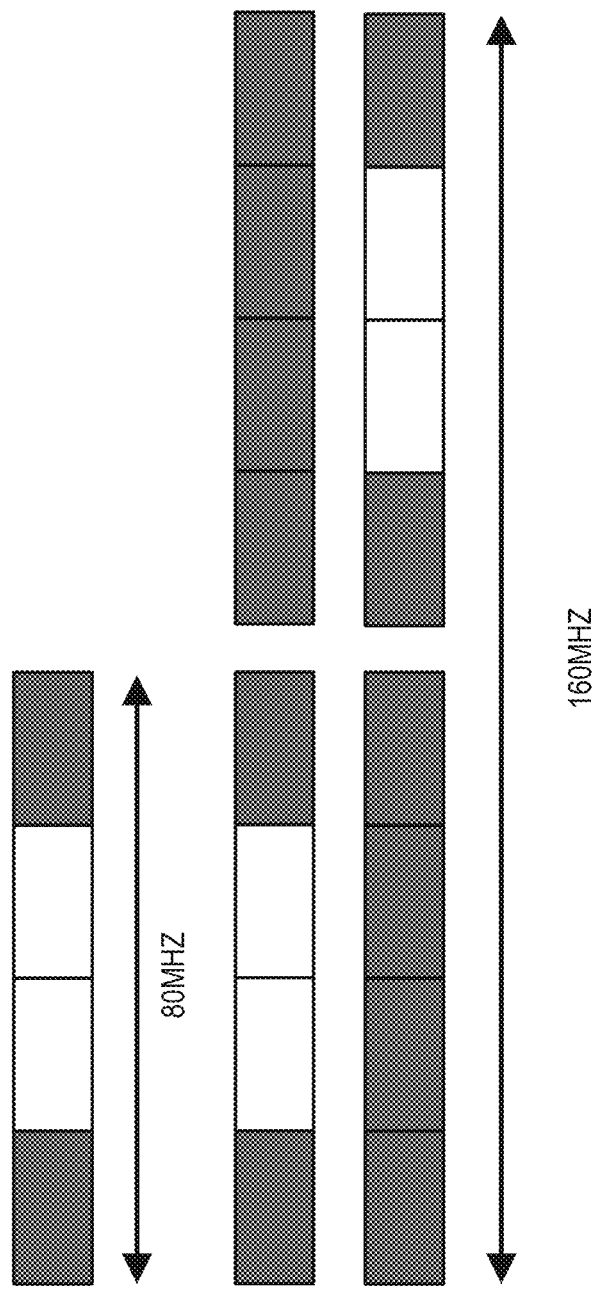
FIG. 34 shows example puncturing patterns, in accordance with some embodiments of the present disclosure.

When more puncturing patterns are supported, an indication to support more flexibility should be defined. For example, the puncturing patterns shown in FIG. 34 cannot be indicated in some embodiments.

Figure 35:
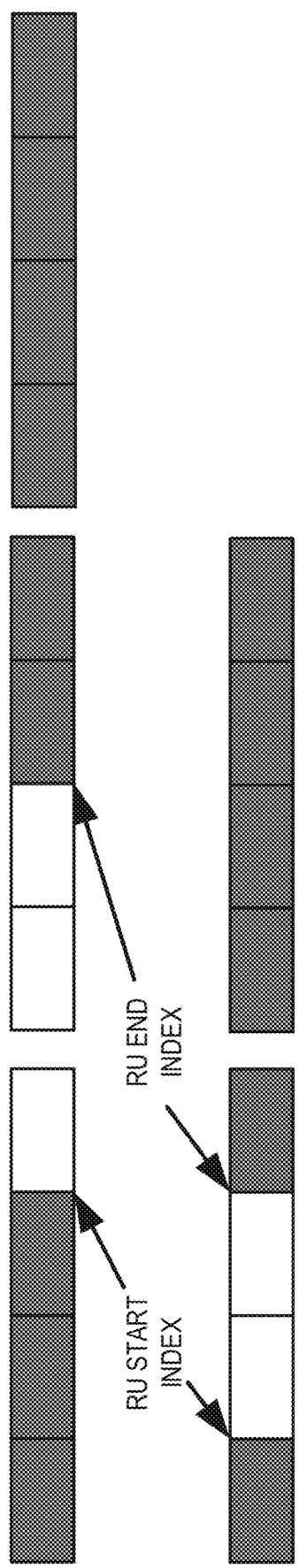
FIG. 35 shows example puncturing patterns with a resource unit starting and ending index, in accordance with some embodiments of the present disclosure.
Figure 36:
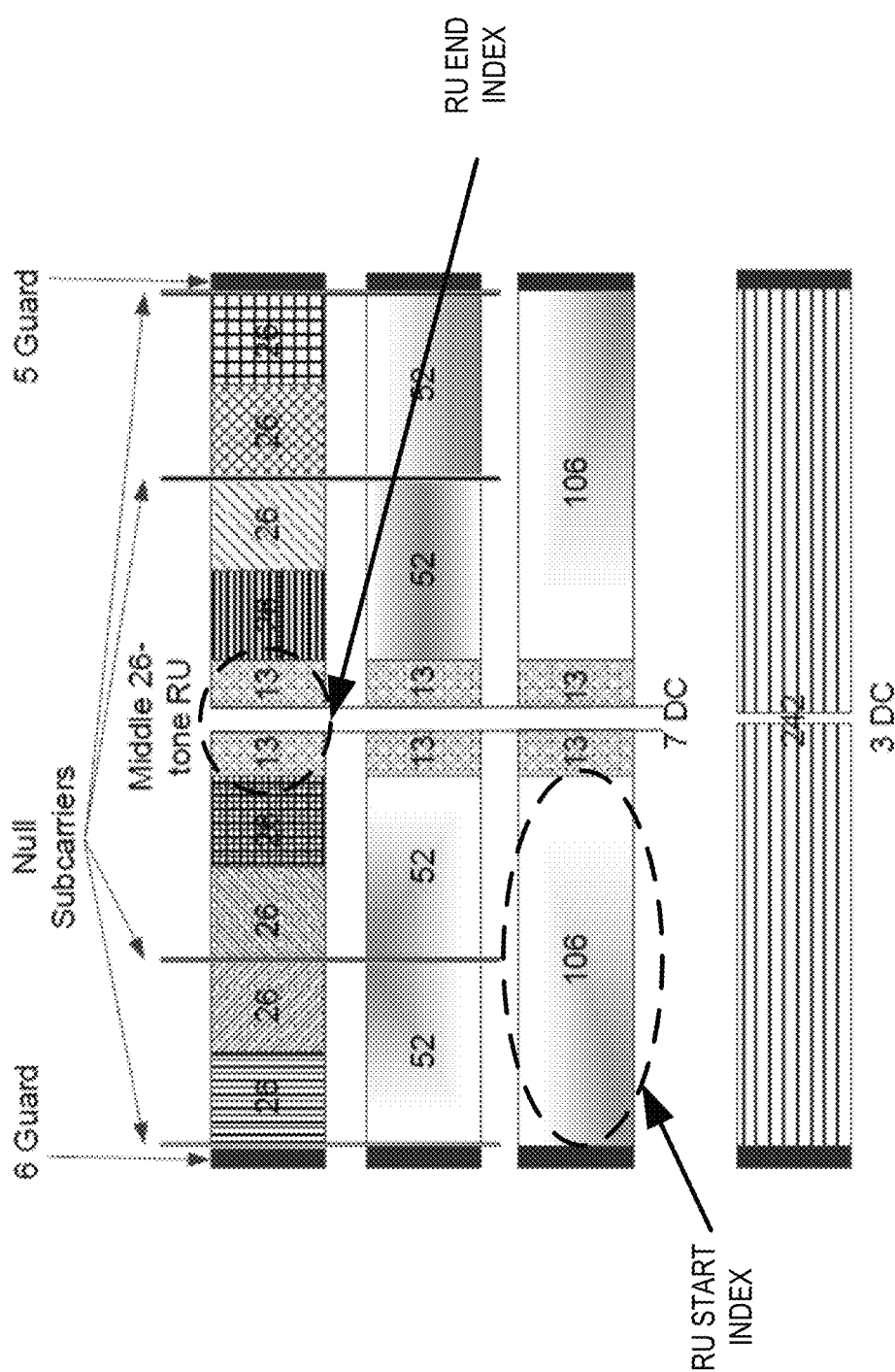
FIG. 36 shows example use of a starting and ending index for puncturing, in accordance with an example embodiment.

To support multiple RUs for a single STA, an RU start index field and an RU end index field could be used to indicate the puncturing pattern. In one embodiment, there are two options on what to indicate, as shown in FIG. 35 and FIG. 36. A first option is to indicate the subchannels to be punctured out. In this embodiment, the RU start index field indicates the starting subchannel to be punctured out and the RU end index field indicates the ending subchannel to be punctured out, as shown in FIG. 35.

A second option is to indicate the subchannels to be transmitted. In this embodiment, the RU start index field indicates the starting subchannel to be transmitted and the RU end index field indicates the ending subchannel to be transmitted, as shown in FIG. 36. For example, multiple RUs could be assigned to a STA with this second option to indicate the location to be transmitted.

In some embodiments, two indication options could be applied to large-size RUs and small-size RUs separately. For instance, a first option indicates large-size RUs assigned to a first STA and a second option indicates small-size RUs assigned to a second STA. In case of large-size RUs assigned to the first STA, resource allocation related control information (e.g., the RU start index field and the RU end index field) indicates the subchannels (or RUs) to be punctured out. In case of small-size RUs assigned to the second STA, resource allocation related control information (e.g., the RU start index field and the RU end index field) indicates the subchannels (or RUs) to be transmitted.

In some embodiments, the indication options could be in a User field, wherein the User field is a field to contain specific control information for a specific user or a specific STA.

In some embodiments, given a single field, two options could be used differently (or differently interpreted) by some control information, such as bandwidth related information, puncturing related information, or RU related information. For example, when a BW field indicates 80 MHz with puncturing, then the RU start index field and the RU end index field could be interpreted based on the first option discussed above. In another example, when the BW field indicates 80 MHz with no puncturing, the RU start index field and the RU end index field could be interpreted based on option 2 discussed above. In still another example, when a BW field indicates 20 MHz, the RU start index field and the RU end index field could be interpreted based on option 2 discussed above.

In an 160/240/320 MHz transmission, these transmissions could contain 80+80/160+80/160+160 MHz transmissions as well. The signaling details could function in a similar fashion as described herein with a basic concept working on BW information and RU information jointly.

In one embodiment, in a PPDU, a resource allocation field contains a RU start index field and a RU end index field, wherein the RU start index field is to indicate the starting subchannel (or RU) among the subchannels (or RUs) to be punctured out and the RU end field indicates the ending subchannel (or RU) among the subchannels (or RUs) to be punctured out. The RU start index field and RU end index field can be interpreted depending on BW information (for example as shown in FIG. 37).

Figure 38:
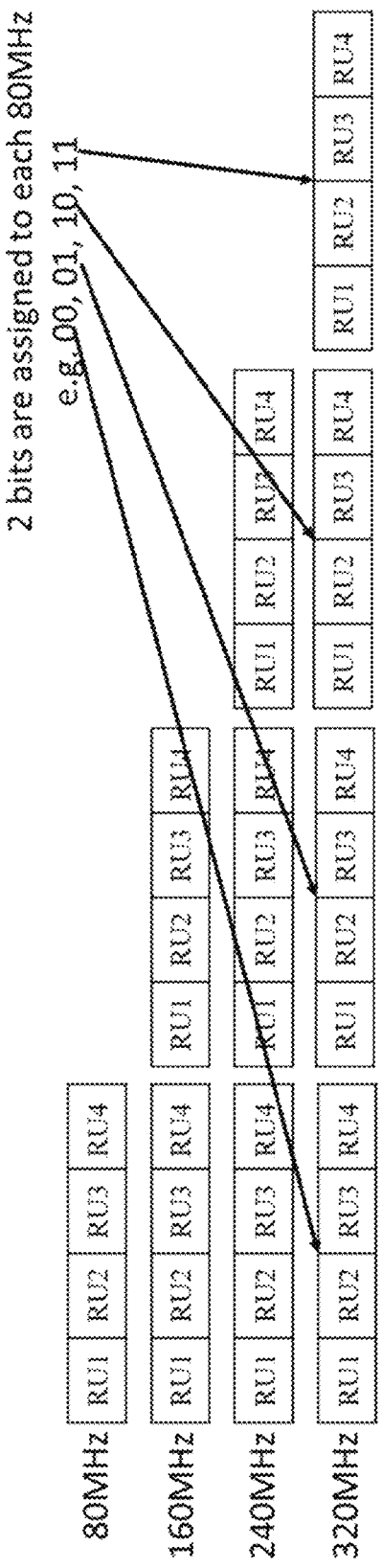
FIG. 38 shows an example of signaling starting or ending resource units to be punctured out, in accordance with an example embodiment.
Figure 39:
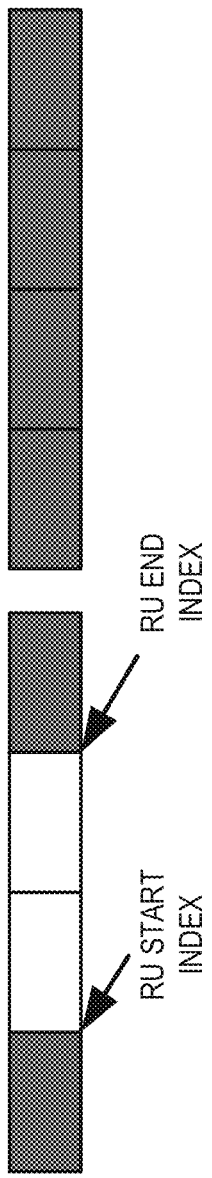
FIG. 39 shows start and end indices for puncturing channels, in accordance with an example embodiment.

The table of FIG. 38 shows one example in which B1B0 indicate which 80 MHz is assigned. For example, when 160 MHz is indicated via BW information, 4 states from 0 to 3 could be indicated to let an STA know which 242-tone RU1 on the indicated 80 MHz could be a starting or an ending RU to be punctured out, as shown in FIG. 38. Given four 242-tone RUs in an 80 MHz channel, where a 320 MHz channel consists of or includes four 80 MHz channels, once two bits indicate the location of an 80 MHz channel, the rest of the bits indicate the location of a 242-tone RU wherein B1B0 should indicate the first 80 MHz subchannel, as shown in FIG. 39. For the rest of the bits of B5-B2, the RU start index field and the RU end index field are set to 1 and 2, respectively.

Figure 40:
FIG. 40 shows punctured channels in a transmission bandwidth, in accordance with an example embodiment.

For example, with a 240 MHz bandwidth indicated as shown in FIG. 40, B1B0 for RU start index and RU end index fields indicate the first and the second 80 MHz, respectively. For the rest of the bits of B5-B2, the RU start index field and the RU end index field are set to 3 and 1, respectively.

Figure 41:
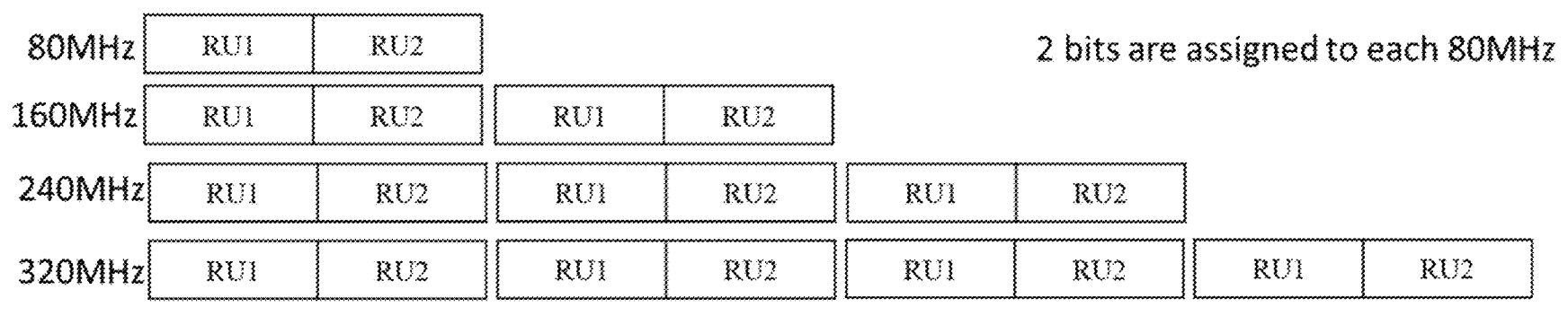

In one example, 2 states from 4 to 5 could be indicated to let an STA know which 484-tone RU1 on an indicated 80 MHz could be a starting or ending RU to be punctured out, as shown in FIG. 41.

Figure 42:
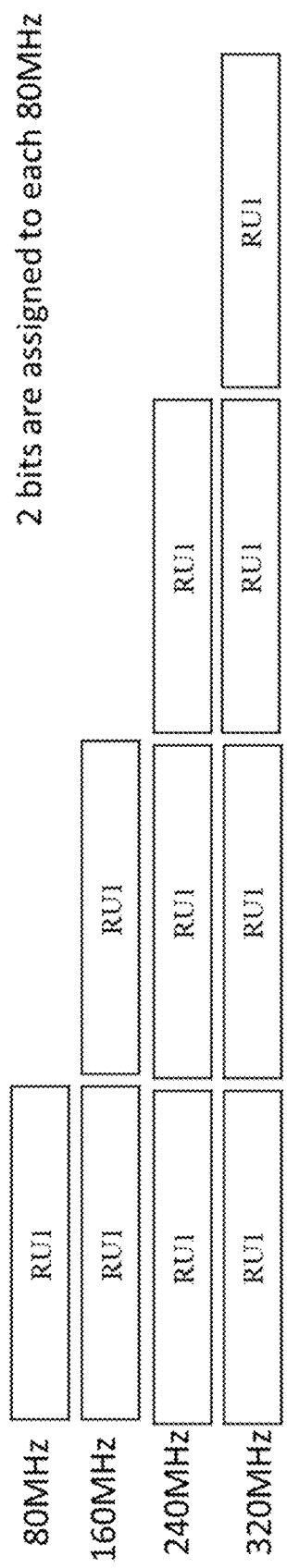
FIG. 42 shows a signaling configuration for puncturing, in accordance with an example embodiment.

In another example, 1 state of 6 could be indicated to let an STA know which 996-tone RU1 on an indicated 80 MHz could be a starting or ending RU to be punctured out, as shown in FIG. 42.

Figure 43:
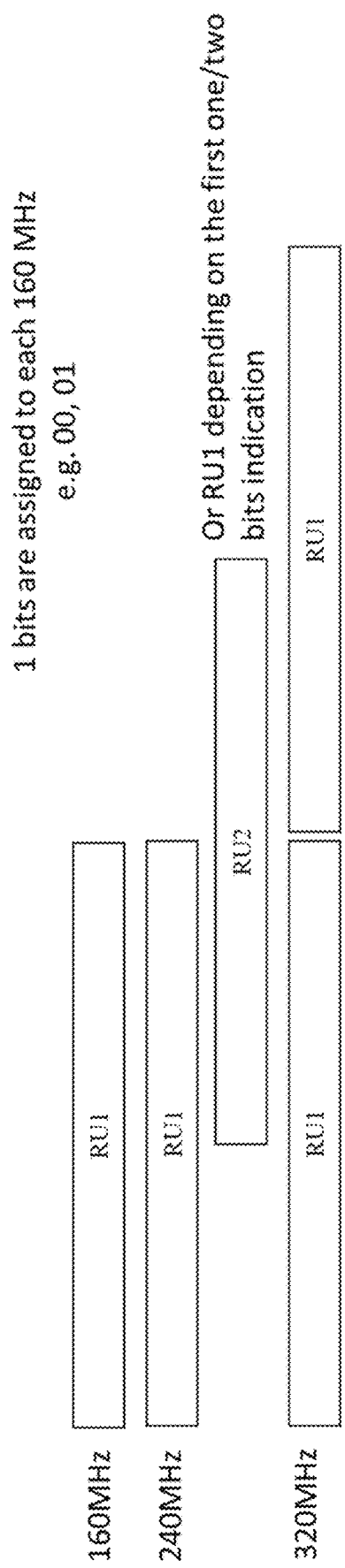
FIG. 43 shows a signaling configuration for puncturing, in accordance with an example embodiment.

In still another example, 2 states from 7 to 8 could be indicated to let an STA know which 2x996-tone RU1 could be a starting or an ending RU to be punctured out, as shown in FIG. 43. In case of a 240 MHz bandwidth channel, there are two 2x996-tone RUs, wherein one RU is across a 160 MHz boundary. For one case, to be consistent, 2 bits are still assigned with B1B0. For the rest of the bits after B1, 1 or 2 states could be used to indicate RU1 jointly encoded with B1B0. Or, for one case, 1 bit could be assigned as B0 and for the rest of the bits after B0, 1 or 2 states could be used to indicate RU1.

Figure 44:
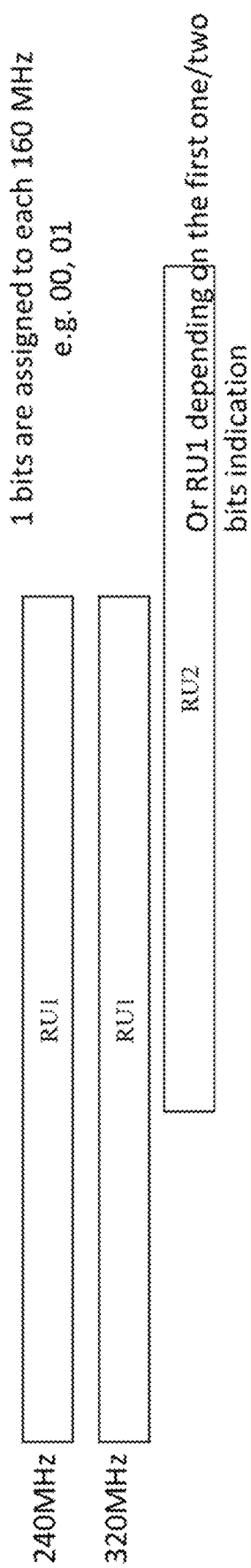
FIG. 44 shows a signaling configuration for puncturing, in accordance with an example embodiment.

In yet another example, 2 states from 9 to 10 could be indicated to let an STA know which 3x996-tone RU1 could be a starting or an ending RU to be punctured out, as shown in FIG. 44. In case of a 320 MHz bandwidth channel, there are two 3x996-tone RUs, wherein two RUs are across a 160 MHz boundary. In one case, to be consistent, 2 bits are still assigned with B1B0. The rest of the bits after B1, 1 or 2 states could be used to indicate RU1 jointly encoded with B1B0. Or, for one case, 1 bit could be assigned as B0 and for the rest of the bits after B0, 1 or 2 states could be used to indicate RU1.

Figure 45:
FIG. 45 shows a signaling configuration for puncturing, in accordance with an example embodiment.

In one example, 1 state of 11 could be indicated to let an STA know which 4x996-tone RU1 could be starting or ending RU to be punctured out, as shown in FIG. 45.

In some embodiments, 2 bits for B1B0 and 4 bits for 12 or 11 states with B5B4B3B2 could be assigned for the RU start index field.

In some embodiments, 2 bits for B1B0 and 4 bits for 12 or 11 states with B5B4B3B2 could be assigned for the RU end index field.

In some embodiments, the RU allocation field contains 6 bits of a RU start index field and 6 bits of a RU end index field.

In some embodiments, in the PPDU, a resource allocation field contains an RU start index field and an RU end index field, wherein the RU start index field is to indicate the starting subchannel (or RU) among the subchannels (or RUs) to be punctured out and the RU end field is to indicate the ending subchannel (or RU) among the subchannels (or RUs) to be punctured out. The RU start index field and the RU end index field can be interpreted jointly with BW information. For example, based on the configuration of FIG. 46: (1) value 0 to 3 if the BW is 80 MHz, where 0 indicates 242-tone RU1 and 3 indicates 242-tone RU4 (values 9-15 are reserved); (2) value 0 to 7 if the BW is 160 MHz, where 0 indicates 242-tone RU1 and 7 indicates 242-tone RU8 (values 9-15 are reserved); (3) value 0 to 11 if the BW is 2400 MHz, where 0 indicates 242-tone RU1 and 11 indicates 242-tone RU12 (values 9-15 are reserved); and (4) value 0 to 15 if the BW is 320 MHz, where 0 indicates 242-tone RU1 and 15 indicates 242-tone RU16.

Figure 47:
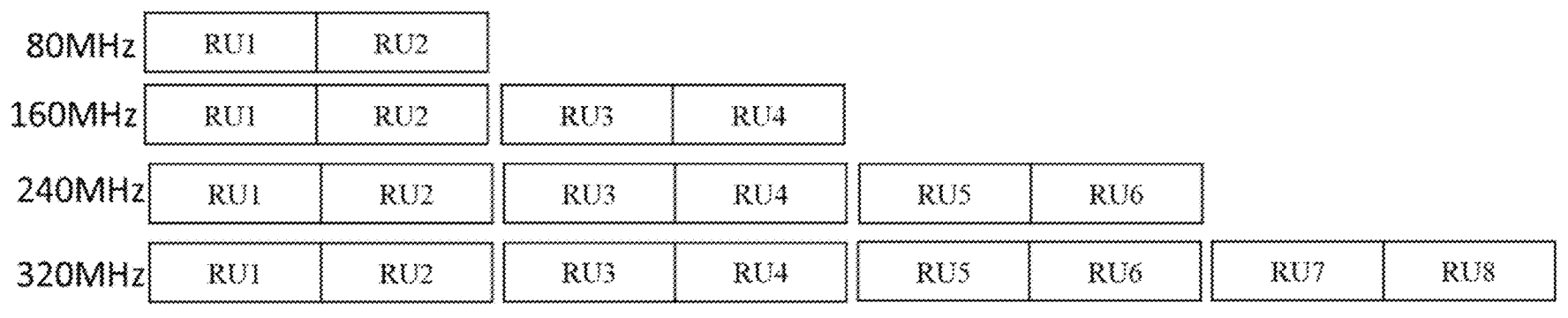

Based on the configuration of FIG. 47: (1) value 0 to 1 if the BW is 80 MHz, where 0 indicates 484-tone RU1 and 1 indicates 484-tone RU2 (values 2-15 are reserved); (2) value 0 to 3 if the BW is 160 MHz, where 0 indicates 484-tone RU1 and 3 indicates 484-tone RU4 (values 4-15 are reserved); (3) value 0 to 5 if the BW is 240 MHz, where 0 indicates 484-tone RU1 and 5 indicates 484-tone RU6 (values 6-15 are reserved); and (4) value 0 to 7 if the BW is 320 MHz, where 0 indicates 484-tone RU1 and 7 indicates 484-tone RU8 (values 8-15 are reserved).

Figure 48:
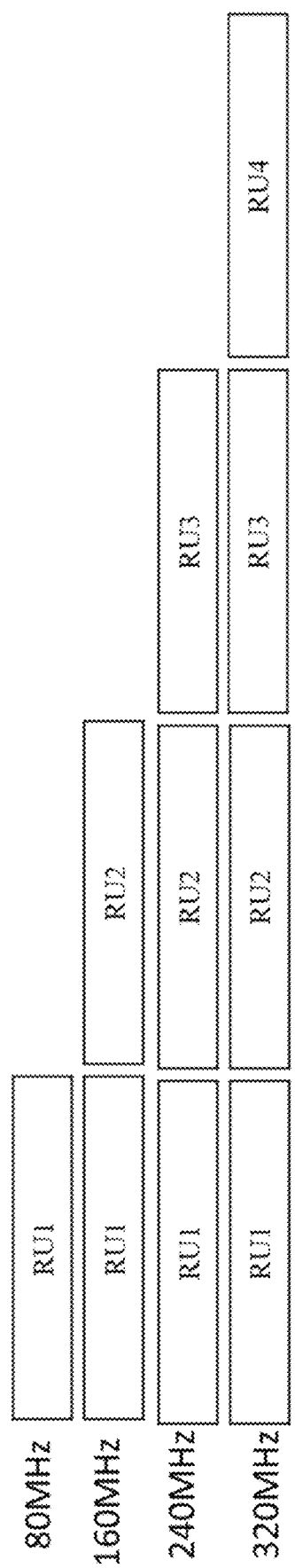
FIG. 48 shows a configuration of resource units in various bandwidths, in accordance with an example embodiment.

Based on the configuration of FIG. 48: (1) value 0 if the BW is 80 MHz, where 0 indicates 996-tone RU1 (values 1-15 are reserved); (2) value 0 to 1 if the BW is 160 MHz, where 0 indicates 996-tone RU1 and 1 indicates 996-tone RU2 (values 3-15 are reserved); (3) value 0 to 2 if the BW is 240 MHz, where 0 indicates 996-tone RU1 and 2 indicates 996-tone RU3 (values 3-15 are reserved); and (4) value 0 to 3 if the BW is 320 MHz, where 0 indicates 996-tone RU1 and 3 indicates 996-tone RU4 (values 4-15 are reserved).

Figure 49:
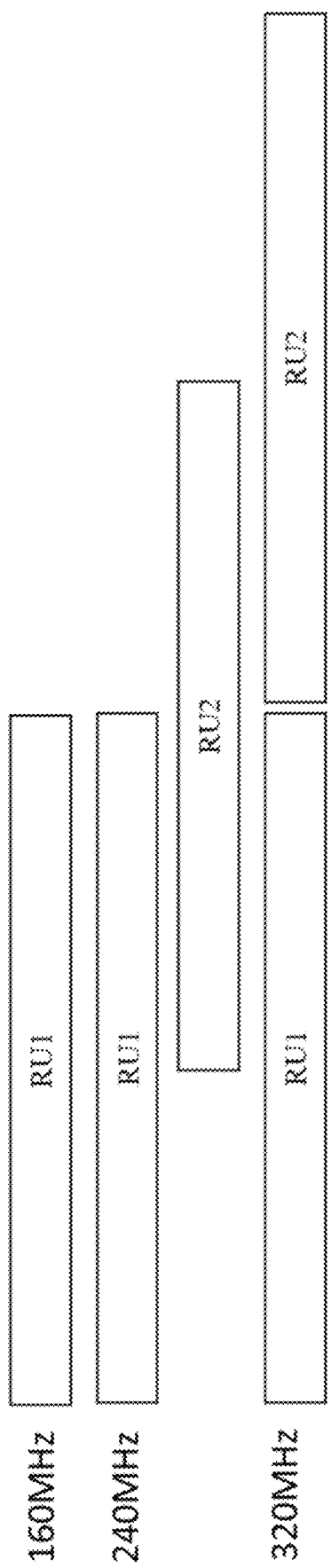
FIG. 49 shows a configuration of resource units in various bandwidths, in accordance with an example embodiment.

Based on the configuration of FIG. 49: (1) value 0 if the BW is 160 MHz, where 0 indicates 2x996-tone RU1 (values 1-15 are reserved); (2) value 0 to 1 if the BW is 240 MHz, where 0 indicates 2x996-tone RU1 and 1 indicates 2x996-tone RU2 (values 2-15 are reserved); and (3) value 0 to 1 if the BW is 320 MHz, where 0 indicates 2x996-tone RU1 and 1 indicates 2x996-tone RU2 (values 2-15 are reserved).

Figure 50:
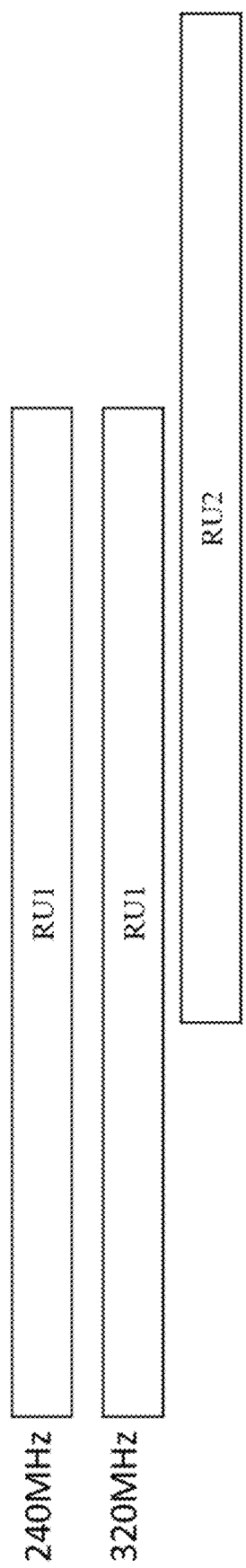
FIG. 50 shows a configuration of resource units in various bandwidths, in accordance with an example embodiment.

Based on the configuration of FIG. 50: (1) value 0 if the BW is 240 MHz, where 0 indicates 3x995-tone RU1 (values 1-15 are reserved) and (2) value 0 to 1 if the BW is 320 MHz, where 0 indicates 3x996-tone RU1 and 1 indicates 3x996-tone RU2 (values 2-15 are reserved).

Figure 51:
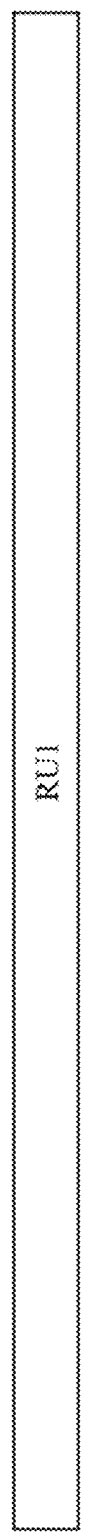
FIG. 51 shows a configuration of resource units in a bandwidth, in accordance with an example embodiment.

Based on the configuration of FIG. 51: value 0 if the BW is 320 MHz, where 0 indicates 4x996-tone RU1 (values 1-15 are reserved).

In some embodiments, 4 bits could be assigned for the RU start index field.

In some embodiments, 4 bits could be assigned for the RU end index field.

In some embodiments, the RU allocation field contains 4 bits of RU start index field and 4 bits of RU end index field.

In some embodiments, a resource allocation field in a PPDU contains a RU start index field and a RU end index field, wherein the RU start index field is to indicate the starting subchannel (or RU) among the subchannels (or RUs) to be transmitted and the RU end field is to indicate the ending subchannel (or RU) among the subchannels (or RUs) to be transmitted. The RU start index field and the RU end index field can be interpreted jointly with BW information (for example as shown in FIG. 52).

Figure 53:
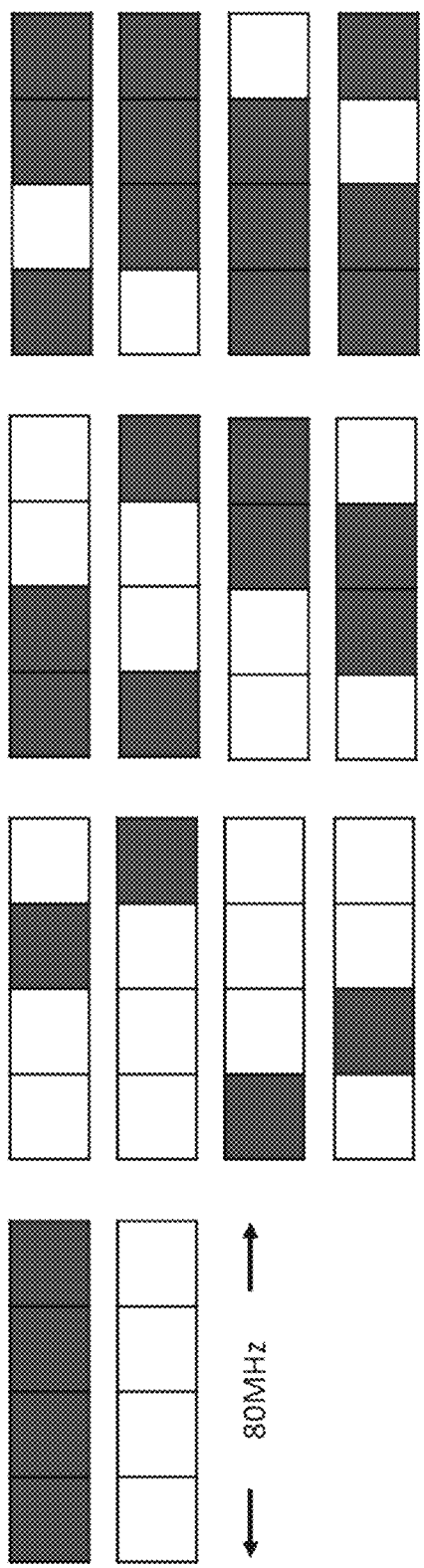
FIG. 53 shows various puncturing patterns, in accordance with an example embodiment.
Figure 54:
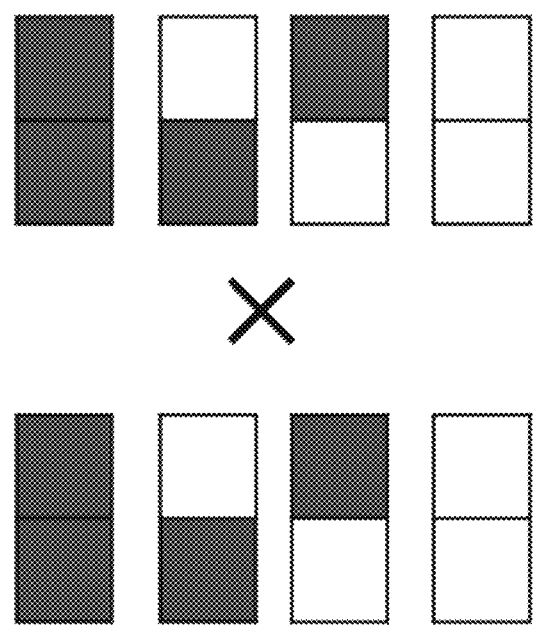
FIG. 54 shows various puncturing patterns, in accordance with an example embodiment.

For flexibility of puncturing patterns, two options could be used. In a first option, as illustrated in FIG. 53, 14 states with 4 bits based on 80 MHz units can be used. To support 320 MHz, up to 32 bits are required. In a second option, as illustrated in FIG. 54, 4 states with 2 bits and 4 states with 2 bits based on 40 MHz units can be used. To support 320 MHz, up to 32 bits are required.

Turning now to FIG. 55, a method 5500 will be described for transmitting a frame in a wireless network, in accordance with an example embodiment. The method 5500 may be performed by one or more devices or components described herein. Further, although described sequentially, the operations of the method 5500 can be performed in entirely or at least partially overlapping time periods. Accordingly, the configuration of the operations in FIG. 55 is for illustrative purposes.

As shown in FIG. 55, the method 5500 may commence at operation 5502 with a wireless device (e.g., 104A or 104B) setting a first field (sometimes referred to as a bandwidth field) of the frame according to a first characteristic of the frame. In one embodiment, the first field indicates a transmission bandwidth of the frame, such that the first characteristic is the bandwidth of the frame. In one embodiment, the first criteria is that the first field indicates that the transmission bandwidth of the frame is equal to or greater than 80 MHz (e.g., 80 Mhz, 160 Mhz, 80+80 MHz, 320 Mhz, etc.).

At operation 5504, the wireless device sets a second field (sometimes referred to as a downlink/uplink field) of the frame according to a second characteristic of the frame. In one embodiment, the second field indicates whether the frame is an uplink frame or a downlink frame. In one embodiment, the second criteria is that the second field of the frame indicates that the frame is a downlink frame, such that the second characteristic is whether the frame is a downlink or uplink frame.

At operation 5506, the wireless device sets a third field (sometimes referred to as a compression field) of the frame according to a third characteristic of the frame. In one embodiment, the third criteria is that the third field indicates that the frame does not employ compression, such that the third characteristic is whether compression is employed by the frame.

At operation 5508, the wireless device sets a puncturing field of the frame in response to one or more of (1) the first field of the frame meeting the first criteria, (2) the second field of the frame meeting the second criteria, and (3) the third field meeting the third criteria. In one embodiment, the puncturing field is associated with puncturing a set of sub-channels of a transmission bandwidth of the frame. In one embodiment, when one or more of (1) the first field indicating that the transmission bandwidth of the frame is less than 80 MHz, (2) the second field of the frame indicating that the frame is an uplink frame, and (3) the third field indicating that the frame does employ compression, bits in the frame representing the puncturing field are undefined and are not set by the wireless device at operation 5508. In one embodiment, the puncturing field is associated with puncturing a set of sub-channels of a transmission bandwidth of the frame. For example, in one embodiment, the puncturing field indicates that one or more 20 MHz sub-channels in the transmission bandwidth have been punctured, such that no transmission is performed on these one or more 20 MHz sub-channels. In one embodiment, the puncturing field indicates that zero 20 MHz sub-channels in the transmission bandwidth have been punctured. In one embodiment, the puncturing field includes at least three bits.

At operation 5510, the wireless device transmits the frame based on the transmission bandwidth and according to the set of sub-channels. In one embodiment, the wireless device transmits the frame to one or more stations/wireless devices in the wireless network. In one embodiment, the frame is an EHT frame and the first, second, and third fields are in one or more signaling fields of the frame.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method for transmitting a frame in a wireless network, the method comprising:
    setting, by a wireless device, a first field of the frame
        according to a first characteristic of the frame;

setting, by the wireless device, a second field of the frame according to a second characteristic of the frame;
setting, by the wireless device, a puncturing field of the frame in response to the first field of the frame meeting a first criteria and the second field of the frame meeting a second criteria, wherein the puncturing field is associated with puncturing a set of sub-channels of a transmission bandwidth of the frame, wherein the first criteria is that the first field indicates that the transmission bandwidth of the frame is equal to or greater than 80 MHz; and
transmitting, by the wireless device, the frame based on the transmission bandwidth and according to the set of sub-channels.

2. The method of claim 1, wherein the second field indicates whether the frame is an uplink frame or a downlink frame.

3. The method of claim 2, wherein the first criteria is that the first field indicates that the transmission bandwidth of the frame is any one of 80 MHz, 160 MHz, 80+80 MHz, and 320 MHz.

4. The method of claim 3, wherein the second criteria is that the second field of the frame indicates that the frame is a downlink frame.

5. The method of claim 4, wherein when one or more of (1) the first field indicates that the transmission bandwidth of the frame is less than 80 MHz and (2) the second field of the frame indicates that the frame is an uplink frame, bits in the frame representing the puncturing field are undefined and are not set by the wireless device.

6. The method of claim 4, wherein the method further comprises:
setting, by the wireless device, a third field of the frame according to a third characteristic of the frame,
wherein setting the puncturing field is further in response to the third field meeting a third criteria.

7. The method of claim 6, wherein the third criteria is that the third field indicates that the frame does not employ compression.

8. The method of claim 7, wherein when one or more of (1) the first field indicates that the transmission bandwidth of the frame is less than 80 MHz, (2) the second field of the frame indicates that the frame is an uplink frame, and (3) the third field indicates that the frame does employ compression, bits in the frame representing the puncturing field are undefined and are not set by the wireless device.

9. The method of claim 1, wherein the puncturing field indicates that one or more 20 MHz sub-channels in the transmission bandwidth has been punctured such that no transmission is performed on these one or more 20 MHz sub-channels.

10. The method of claim 1, wherein the puncturing field indicates that zero 20 MHz sub-channels in the transmission bandwidth have been punctured.

11. The method of claim 1, wherein the puncturing field includes at least three bits.

12. A wireless device for transmitting a frame in a wireless network, the wireless device comprising:
a processor; and
a set of memory units coupled to the processor, wherein the set of memory units include instructions that when executed by the processor cause the wireless device to:
set a first field of the frame according to a first characteristic of the frame,
set a second field of the frame according to a second characteristic of the frame,
set a puncturing field of the frame in response to the first field of the frame meeting a first criteria and the second field of the frame meeting a second criteria, wherein the puncturing field is associated with puncturing a set of sub-channels of a transmission bandwidth of the frame, wherein the first criteria is that the first field indicates that the transmission bandwidth of the frame is equal to or greater than 80 MHz, and
transmit the frame based on the transmission bandwidth and according to the set of sub-channels.

13. The wireless device of claim 12, wherein the second field indicates whether the frame is an uplink frame or a downlink frame.

14. The wireless device of claim 13, wherein the first criteria is that the first field indicates that the transmission bandwidth of the frame is any one of 80 MHz, 160 MHz, 80+80 MHz, and 320 MHz; and
wherein the second criteria is that the second field of the frame indicates that the frame is a downlink frame.

15. The wireless device of claim 14, wherein when one or more of (1) the first field indicates that the transmission bandwidth of the frame is less than 80 MHz and (2) the second field of the frame indicates that the frame is an uplink frame, bits in the frame representing the puncturing field are undefined and are not set by the wireless device.

16. The wireless device of claim 14, wherein the instructions when executed by the processor further cause the wireless device to:
set a third field of the frame according to a third characteristic of the frame,
wherein setting the puncturing field is further in response to the third field meeting a third criteria, and
wherein the third criteria is that the third field indicates that the frame does not employ compression.

17. The wireless device of claim 16, wherein when one or more of (1) the first field indicates that the transmission bandwidth of the frame is less than 80 MHz, (2) the second field of the frame indicates that the frame is an uplink frame, and (3) the third field indicates that the frame does employ compression, bits in the frame representing the puncturing field are undefined and are not set by the wireless device.

18. The wireless device of claim 12, wherein the puncturing field indicates that one or more 20 MHz sub-channels in the transmission bandwidth has been punctured such that no transmission is performed on these one or more 20 MHz sub-channels.

19. A non-transitory machine-readable storage medium that includes instructions which, when executed by a processor of a wireless device, cause the wireless device to:
set a first field of a frame according to a first characteristic of the frame;
set a second field of the frame according to a second characteristic of the frame;
set a puncturing field of the frame in response to the first field of the frame meeting a first criteria and the second field of the frame meeting a second criteria, wherein the puncturing field is associated with puncturing a set of sub-channels of a transmission bandwidth of the frame, wherein the first criteria is that the first field indicates that the transmission bandwidth of the frame is equal to or greater than 80 MHz; and
transmit the frame based on the transmission bandwidth and according to the set of sub-channels.

* * * * *